United States Patent
Teague

(10) Patent No.: US 11,861,462 B2
(45) Date of Patent: Jan. 2, 2024

(54) PREPARING STRUCTURED DATA SETS FOR MACHINE LEARNING

(71) Applicant: Nicholas John Teague, Orlando, FL (US)

(72) Inventor: Nicholas John Teague, Orlando, FL (US)

(*) Notice: Subject to any disclaimer, the term of this patent is extended or adjusted under 35 U.S.C. 154(b) by 908 days.

(21) Appl. No.: 16/552,857

(22) Filed: Aug. 27, 2019

(65) Prior Publication Data

US 2020/0349467 A1 Nov. 5, 2020

Related U.S. Application Data

(60) Provisional application No. 62/842,401, filed on May 2, 2019.

(51) Int. Cl.
*G06N 20/00* (2019.01)
*G06F 16/90* (2019.01)
*G06F 16/27* (2019.01)
*G06F 18/21* (2023.01)
*G06F 16/901* (2019.01)
(Continued)

(52) U.S. Cl.
CPC ........... *G06N 20/00* (2019.01); *G06F 16/278* (2019.01); *G06F 16/9027* (2019.01); *G06F 18/214* (2023.01); *G06F 18/2135* (2023.01)

(58) Field of Classification Search
CPC ... G06N 20/00; G06F 16/278; G06F 16/9027; G06K 9/6247; G06K 9/6256
See application file for complete search history.

(56) References Cited

U.S. PATENT DOCUMENTS

2016/0092475 A1* 3/2016 Stojanovic .......... G06F 3/04883
707/805
2016/0104077 A1* 4/2016 Jackson, Jr. .......... G06N 7/005
706/12
(Continued)

OTHER PUBLICATIONS

Buda, et al., "A systematic study of the class imbalance problem in convolutional neural networks," Neural Networks 106, Oct. 2017.
(Continued)

*Primary Examiner* — Hares Jami

(57) ABSTRACT

A technique for automated preparation of tabular data for machine learning, including options for machine learning derived infill, feature importance evaluations, and/or dimensionality reduction. Validation data sets may be consistently prepared to training data sets based on properties of the training data saved in a metadata database. Additional data sets may be consistently prepared to training data sets based on properties of the training data saved in a returned metadata database such as for use in generating predictions from the trained ML system. Returned data sets may be prepared for oversampling of labels with lower frequency occurrence. Columns of a training data set are evaluated for appropriate categories of transformations, with the composition of transformation function applications designated by a defined tree of transformation category assignments to transformation primitives. Composition of transformation trees and their associated transformation functions may optionally be custom defined by a user.

8 Claims, 11 Drawing Sheets

(51) Int. Cl.
    *G06F 18/214*     (2023.01)
    *G06F 18/2135*    (2023.01)

(56)          References Cited

U.S. PATENT DOCUMENTS

2017/0364815 A1*  12/2017  Yoldemir ............... G06N 20/00
2020/0134083 A1*   4/2020  Elliman ................. G06F 17/18
2020/0250477 A1*   8/2020  Barthur ................. G06N 20/00
2020/0327252 A1*  10/2020  Mcfall .................... G06F 21/78

OTHER PUBLICATIONS

"Fast.ai: Making neural nets uncool again," fast.ai, 2019, Retrieved from the Internet: URL: https://www.fast.ai [Retrieved on Aug. 27, 2019].

McKinney, Wes, "Data Structures for Statistical Computing in Python," Proceedings of the 9th Python in Science Conference (SCIPY 2010).

NumPy, 2019, Retrieved from the Internet: URL: https://www.numpy.org [Retrieved on Aug. 27, 2019].

Parr, et al., "Beware Default Random Forest Importances," Mar. 26, 2018, Retrieved from the Internet: URL: https://explained.ai/rf-importance/index.html [Retrieved on Aug. 27, 2019].

Pedregosa, et al., "Scikit-learn: Machine Learning in Python," Journal of Machine Learning Research 12, Oct. 2011.

* cited by examiner

PREPARING STRUCTURED DATA SETS FOR MACHINE LEARNING

BACKGROUND

Machine learning (ML) is becoming an increasingly important part of the software landscape. Machine learning is a type of artificial intelligence (AI) and ML helps enable a software system to learn to recognize patterns from data without being directly programmed to do so. Machine learning can refer to a wide range of techniques. Examples of ML techniques can include logistic regression, support vector machines, decision trees, autoencoders, neural networks, deep learning, etc. ML techniques may be based on supervised or unsupervised learning techniques. Broadly, ML operate in two phases, a training phase, whereby models and/or weights are adjusted based on input training data, and an operating phase whereby these models and/or weights are applied to actual input data to generate predictions. In supervised learning the training phase makes use of training data and labels, in unsupervised learning the training is performed without labels based on algorithmically inferred properties, such as groupings or correlations, within the training data.

Generally, supervised ML operates by defining one or more levels of statistical relationships, often referred to as weights, between various features of input data. These weights are generally defined and/or adjusted in a training phase. During the training phase, labeled training data is fed into a ML system. The ML system effectively takes a best guess based on the weights in the ML system applied to the training data and outputs a result. This result is compared to the labels of the training data. These labels define the ground truth which the ML system is being trained to detect. Results of the comparison between the labels and the output of the ML system are used to update the weights of the ML system. Typically, a ML system may be trained on a substantial amount of training data, typically on the order of hundreds to millions of sample inputs or more. Often the quality and amount of training data can directly influence the quality of the resulting ML system.

Data for a ML system often needs to be manipulated or numerically encoded prior to being used for training. Further, to reliably generate predictions using the ML system after training, test data that is consistent with the training data should be used. Consistency of the test data may be provided by manipulating or numerically encoding the test data in a manner consistent with the training data. For example, data may need to be transformed into tidy tabular data, normalized, converted to a useable encoding, missing data infilled, dimensionally adjusted, separated into various data sets for training and validation, etc. Specific transformations and/or parameters of those transformations may be derived based on properties of the data in the training set to avoid potential data leakage as between the training data, validation data, and test data. Often one or more of these transformation steps require manual operations, for example, by a data analyst or programmer. After initial training is complete, there may be a desire for additional consistent data processing, for example, to generate predictions by the ML system, to fine tune or adjust the ML system to better handle cases in which were not properly handled by the ML system after the initial training, or to train a new ML model with consistently formatted data. Thus, what is needed is a technique for automatically preparing training data for ML systems based on properties of the training data and consistently prepare additional training, validation, or test data for the ML system based on properties of the original training data.

SUMMARY

This disclosure relates generally to machine learning (ML). More particularly, but not by way of limitation, aspects of the present disclosure relate to a method for consistently preparing data for a ML system based on properties of transformations that may be derived from a training set, comprising receiving a tabular training data set. In certain cases, the data sets may be in a tidy data form where tidy data refers to having a single column per feature and a single row per observation. The method includes identifying or assigning column labels from the training data set, the column labels associated with a source column of data points, determining, for each identified column label, a root category based on one or more variable types, data properties, or distribution properties associated with the data points in each column of the set of source columns, performing one or more data transformations for data points in each column in an order based on defined primitives of a transformation tree to obtain a transformed data set, the transformation tree including defined primitive category entries associated with each root category, wherein the defined primitives associated with the source column are based on a root category associated with the source column, and wherein the defined primitive category entries for the root category are associated with a set of data transformations, the set of data transformations including one or more types of data transformations to be performed, recording the column categories determined for each identified column label and properties of the data transformations performed for each source column in a metadata database, outputting the metadata database and transformed training data set for training a ML system, receiving a tabular additional data set and the metadata database, performing the one or more data transformations for data points in corresponding additional columns of the tabular additional data set using the recorded column categories and properties of the data transformations from the metadata database to obtain a transformed additional data set, and outputting the transformed additional data set for use with the ML system.

Another aspect of the present disclosure relates to a non-transitory program storage device comprising instructions stored thereon to cause one or more processors to receive a tabular training data set, the training data set including a set of source columns having one or more source columns. In certain cases, the data sets may be in a tidy data form where tidy data refers to having a single column per feature and a single row per observation. The instructions further cause the one or more processors to identify or assign column labels from the training data set, the column labels associated with a source column of data points, determine, for each identified column label, a root category based on one or more variable types, data properties, or distribution properties associated with the data points in each column of the set of source columns, perform one or more data transformations for data points in each column in an order based on defined primitives of a transformation tree to obtain a transformed data set, the transformation tree including defined primitive category entries associated with each root category, wherein the defined primitives associated with the source column are based on a root category associated with the source column, and wherein the defined primitive category entries for the root category are associated with a set of data transformations, the set of data transformations including one or more types of data transformations to be performed, record the column categories determined for each identified column label and properties of the data transformations performed for each source column in a metadata database, output the metadata database and transformed training data set for training a ML system, receive a tabular additional data set and the metadata database, perform the one or more data transformations for data points in corresponding additional columns of the tabular additional data set using the recorded column categories and properties of the data transformations from the metadata database to obtain a transformed additional data set, and output the transformed additional data set for use with the ML system.

Another aspect of the present disclosure relates to an electronic device, comprising a memory, and one or more processors operatively coupled to the memory, wherein the one or more processors may be configured to execute instructions causing the one or more processors to receive a tabular training data set, including a set of source columns having one or more source columns. In certain cases, the data sets may be in a tidy data form where tidy data refers to having a single column per feature and a single row per observation. The instructions further cause the one or more processors to identify or assign column labels from the training data set, the column labels associated with a source column of data points, determine, for each identified column label, a root category based on one or more variable types, data properties, or distribution properties associated with the data points in each column of the set of source columns, perform one or more data transformations for data points in each column in an order based on defined primitives of a transformation tree to obtain a transformed data set, the transformation tree including defined primitive category entries associated with each root category, wherein the defined primitives associated with the source column are based on a root category associated with the source column, and wherein the defined primitive category entries for the root category are associated with a set of data transformations, the set of data transformations including one or more types of data transformations to be performed, record the column categories determined for each identified column label and properties of the data transformations performed for each source column in a metadata database, output the metadata database and transformed training data set for training a ML system, receive a tabular additional data set and the metadata database, perform the one or more data transformations for data points in corresponding additional columns of the tabular additional data set using the recorded column categories and properties of the data transformations from the metadata database to obtain a transformed additional data set, and output the transformed additional data set for use with the ML system.

Another aspect of the present disclosure relates to a system comprising a memory, and one or more processors operatively coupled to the memory, wherein the one or more processors may be configured to execute instructions causing the one or more processors to receive a tabular training data set, the training data set including a set of source columns having one or more source columns. In certain cases, the data sets may be in a tidy data form where tidy data refers to having a single column per feature and a single row per observation, identify or assign column labels from the training data set, the column labels associated with a source column of data points, determine, for each identified column label, a root category based on one or more variable types, data properties, or distribution properties associated with the data points in each column of the set of source columns, perform one or more data transformations for data points in each column in an order based on defined primitives of a transformation tree to obtain a transformed data set, the transformation tree including defined primitive category entries associated with each root category, wherein the defined primitives associated with the source column are based on a root category associated with the source column, and wherein the defined primitive category entries for the root category are associated with a set of data transformations, the set of data transformations including one or more types of data transformations to be performed, record the column categories determined for each identified column label and properties of the data transformations performed for each source column in a metadata database, output the metadata database and transformed training data set for training a ML system, receive a tabular additional data set and the metadata database, perform the one or more data transformations for data points in corresponding additional columns of the tabular additional data set using the recorded column categories and properties of the data transformations from the metadata database to obtain a transformed additional data set, and output the transformed additional data set for use with the ML system.

The data transformations may be for the purposes of meeting prerequisites of machine learning algorithms such as numerical encoding and/or for improving the accuracy or efficiency of ML training such as by normalization or feature engineering.

Additionally, another aspect of one or more portions of the present disclosure relates to the optional automated derivation and consistent application of machine learning derived infill for missing or improperly formatted data in the training and/or test data sets. More particularly, but not by way of limitation, aspects of the present disclosure relate to determining, for zero or more rows for each column, where infill is needed, determining a type of infill for each column based in part on the column categories, and filling the determined rows where infill is needed based on the determined type of infill, wherein if the determined type of infill for the column is a ML infill, further comprising determining a predictive model based on the column categories for the column, training the predictive model based on partitioned portions of the training data set derived around the target column or set of target columns, predicting a set of data points for infilling based on partitioned portions of the training data set derived around the target column or set of target columns, inserting the set of data points for infilling in the determined rows where infill is needed, recording the predictive model associated with each target column or set of target columns in a metadata database, and then for additional data sets determining where infill is needed, retrieving the predictive model from the metadata database, predicting a set of data points for infilling based on partitioned portions of the additional data set derived around the target column or set of target columns, and inserting the set of data points for infilling in the determined rows where infill is needed.

Additionally, another aspect of one or more portions of the present disclosure relates to the optional automated derivation of feature importance metrics for the columns in the data sets. More particularly, but not by way of limitation, aspects of the present disclosure relate to the automated preparing of a tidy data set and associated labels set for machine learning, training a predictive model from these sets, deriving a first accuracy metric of this model from a validation set partitioned form the train set, for each column in the training set deriving supplemental sets by randomly shuffling the values in columns associated with the target column into the validation set, wherein the designation of the columns to be shuffled can be varied for different versions of the feature importance metric, applying that supplemental validation set to the trained model to derived a second accuracy metric, and deriving a feature importance metric by comparison of the first and second accuracy metrics.

Additionally, another aspect of one or more portions of the present disclosure relates to the optional automated derivation and consistent application of dimensionality reduction to the data in the training and test data sets. More particularly, but not by way of limitation, aspects of the present disclosure relate to options for dropping columns based on derived feature importance metrics, transforming data sets via principle component analysis (PCA), or both, wherein the application of PCA may include automated preparing of a tidy training data set for machine learning, selecting a type of PCA model such as may be determined based on properties of the data, initializing a PCA model, training that PCA model on the train set, applying that PCA model to transform the train set, recording the PCA in a metadata database, and then for additional data sets preparing the additional data set for machine learning, retrieving the PCA model from the metadata database, and applying that PCA model to consistently transform the additional data set.

Additionally, another aspect of one or more portions of the present disclosure relates to the optional consistent preparation of validation data for machine learning in conjunction with the preparation of training data for machine learning. More particularly, but not by way of limitation, aspects of the present disclosure relate to receiving a tabular training data set in tidy data form where tidy data refers to having a single column per feature and a single row per observation, partitioning a portion of that set for validation purposes of the target ML system, preparing the remaining train data for machine learning to produce a transformed set along with a populated metadata database such as to consistently prepare additional data, performing the one or more data transformations for data points in corresponding columns of the validation data set using the recorded column categories and properties of the data transformations from the metadata database to obtain a consistently transformed validation data set, and outputting the transformed validation data set for use with the ML system.

Additionally, another aspect of one or more portions of the present disclosure relates to a method for consistently preparing data for a ML system based on properties of transformation derived from a training set, wherein the parameters of transformations and/or their associated transformation functions may optionally be user defined. More particularly, but not by way of limitation, aspects of the present disclosure relate to a method for consistently preparing data for a ML system based on properties of transformation derived from a training set wherein the type of infill applied to distinct columns may be user defined, the root categories for distinct columns may be user defined, the transformation tree defined primitive category entries for specific root categories may be user defined, the defined transformation functions associated with category entries may be user defined, and/or default root categories assigned based on algorithmic evaluations of data properties may be user defined.

Additionally, another aspect of one or more portions of the present disclosure relates to a method for preparing data for a ML system, wherein the outputted transformed training data set or transformed additional data set may be prepared for oversampling of labels with lower frequency of occurrence in the set. More particularly, but not by way of limitation, aspects of the present disclosure relate to a method for appending zero or more additional copied sets of rows of a data set corresponding to each of a set of target labels based on a multiplier derived from the counts of label occurrences in a categorical set of labels, wherein the labels for this method may optionally be derived from a binned aggregations of the label data, such as for example number of standard deviations from the mean or data point powers of 10 for a numerical set.

BRIEF DESCRIPTION OF THE DRAWINGS

For a detailed description of various examples, reference will now be made to the accompanying drawings in which.

DETAILED DESCRIPTION

Figure 1:
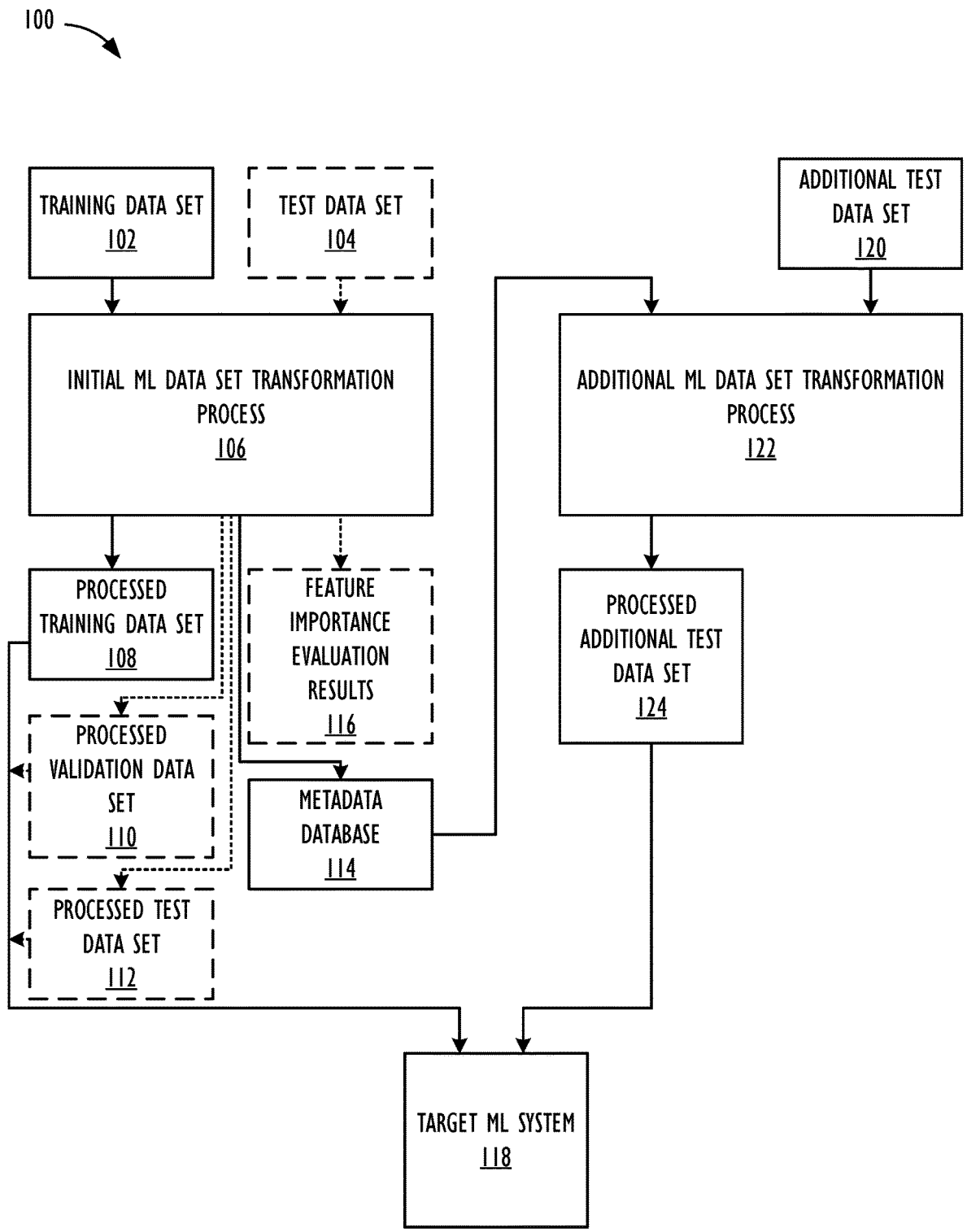
FIG. 1 is a block diagram of an application for preparing structured datasets for ML training, in accordance with aspects of the present disclosure.

FIG. 1 is a block diagram of an application 100 for preparing structured datasets for ML training, in accordance with aspects of the present disclosure. Often, training data may be processed to prepare the data for use in training ML systems. For example, the training data may be received in a tidy form with each column representing a particular feature and a single row represents a particular observation. The data may be transformed to extract or enhance the information available in the data set, for example, through numerical encoding, normalization, Boolean conversion, infill, etc. Additionally, one or more datasets may be separated into subsets. For example, labels may also be split out into a separate set associated with the other data sets, and the training set may be split between a training data set and one or more validation data sets. In certain cases, test data sets may be received separate from the training data set and transformed. In certain cases, the transformations applied to the test data sets may be substantially consistent with those applied to the training data set. After the initial data sets are prepared, the data sets may be used to train the target ML system. Post training, it may be desirable to be able to consistently prepare additional data sets for the target ML system. As used herein, consistent preparation, consistent processing, or consistent formatting refers to applying transformations in a substantially consistent manner to those applied to the training data set, or data sets that have been so transformed. This additional data sets may be used, for example, to generate predictions using the target ML system, perform additional training of the target ML system, or train a new ML model with consistently formatted data. As the initial training data set processing can involve a significant number of steps and application of specific data transformation processes, it would be desirable to have a system capable of streamlining the processing of the additional data that is consistent with how the initial training data set was processed.

Referring to the current example, an initial training data set 102 may be received by a ML data set transformation process 106. In certain cases, the initial training data set 102 may be received along with an initial test data set 104. The ML data set transformation process 106 performs a series of transformation steps on the received data sets and outputs the processed training data set 108. In some cases, a consistently processed validation data set 110 may also be output. In some cases, a processed test data set 112 may also be output if a test data set 104 was received and/or requested. In cases where the test data set 104 is not provided, the processed test data set 112 may be based on portions of the processed training data set 108. The processed training data set 108 and, in some cases, processed validation data set 110 may be used by the target ML system 118 for training the ML system 118. In cases where the test data set 104 was passed to the initial ML data set transformation process 106, the returned processed test data set 112 may be used by the target ML system 118, for example, for making predictions based on the test data set 104. In some cases, the training and/or prediction generation of the target ML system 118 using processed data sets may be supplemented by an external corresponding data sets not processed by the initial ML data set transformation process 106 and/or the processed test data set 112, for example such as if labels are not passed, or, as another example, if a row may have a corresponding image file. In such cases, the pairing of processed data sets with external corresponding data sets may be supported by an ID set containing row index information which may be returned as a separate information type for the returned processed data sets. The ML system 118 may be any ML system and may be separate from the ML data set transformation process 106.

The series of transformation steps performed by the ML data set transformation process 106 may be user defined, or in certain cases, automatically determined by the ML data set transformation process 106 based on properties of the data in the received training data set 102. The ML data set transformation process 106 tracks the specific transformations applied to the data sets and outputs parameters of these transformations in a separate metadata database 114. Additionally, a feature importance results report 116 may also be outputted. In certain cases, the feature importance results report 116 may be an informational report, for example to the user. In certain cases, results of a feature importance evaluation may also be included in the metadata database 114. The metadata database 114 may be provided to the ML data set transformation process 122 to process an additional test data set 120. Consistent processing of this additional test data set 120 may be performed based on information from the metadata database 114 without having to specify the specific transformations. Where the ML data set transformation process 106 determined specific transformation processes to apply to the initial training data set 102, these specific transformation processes may be applied based on the metadata database 114 without redetermining those specific transformation processes and/or redetermining transformation parameters inferred from properties of the training data. An additional test data set 120 may thus be processed by an additional ML data set transformation process 122 and the returned processed additional test set 124 may be used by the target ML system 118, for example, for making predictions based on the additional test data set 120.

In certain cases, if the scale of data in an original training data 102 set exceeds a resource limit, such as a memory limit, run time limit, user defined time constraint, etc., there may be a desire to partition the original training data set into an initial training set and one or more additional training data sets. Information in the initial training data set may be used to generate and populate a metadata database 114 indicating the transformations applied to obtain the processed training data set 108. Consistent transformations may then be applied to the remaining partition or partitions of the original training data set by passing this data to the additional ML data set transformation process 122 as an additional test data set 120 in conjunction with the returned metadata database 114 to process the remainder of the original training data set to be returned as a processed additional test data set 124. Similarly, when the scale of data in a test data set 104 or additional test data set 120 exceeds the resource limit, that data set may be partitioned for iterated application of consistent processing in the additional ML data set transformation process 122.

Referring to the process flow for FIG. 1, an alternate means for consistent processing of the additional test data set at block 120 may be achieved without the use of the metadata database of block 114 and without the use of the additional ML data set transformation process of block 122 by passing the additional test data set of block 120 to the initial ML data set transformation process of block 106 as a test data set of block 104 in conjunction with the original training data set for which consistent processing is desired as block 102, returning a processed test data set 112 comparable to the processed additional test data set of block 124.

Figure 2A:
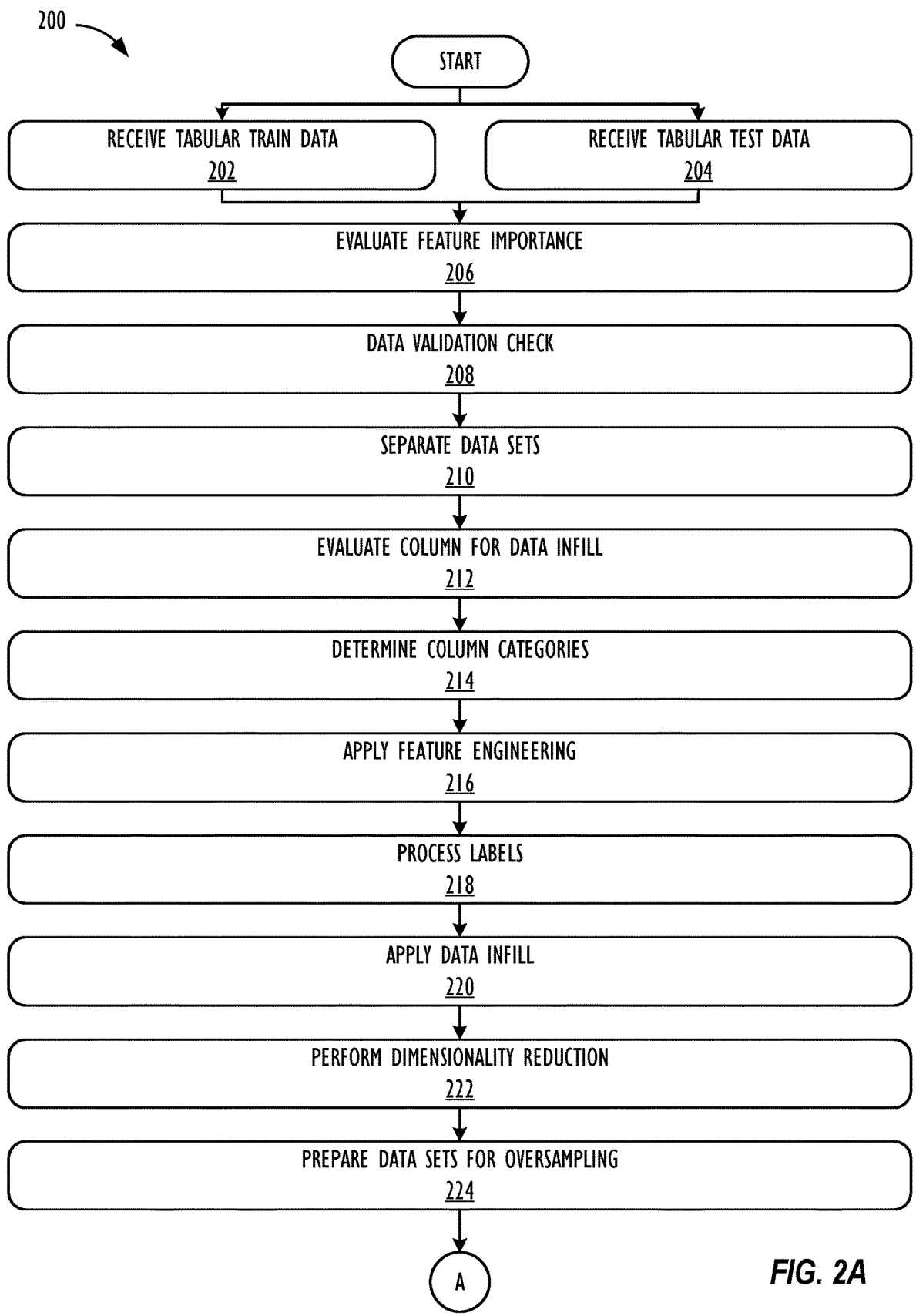
FIG. 2 is a flow diagram for a technique for processing training and/or test data, in accordance with aspects of the present disclosure.
Figure 2B:
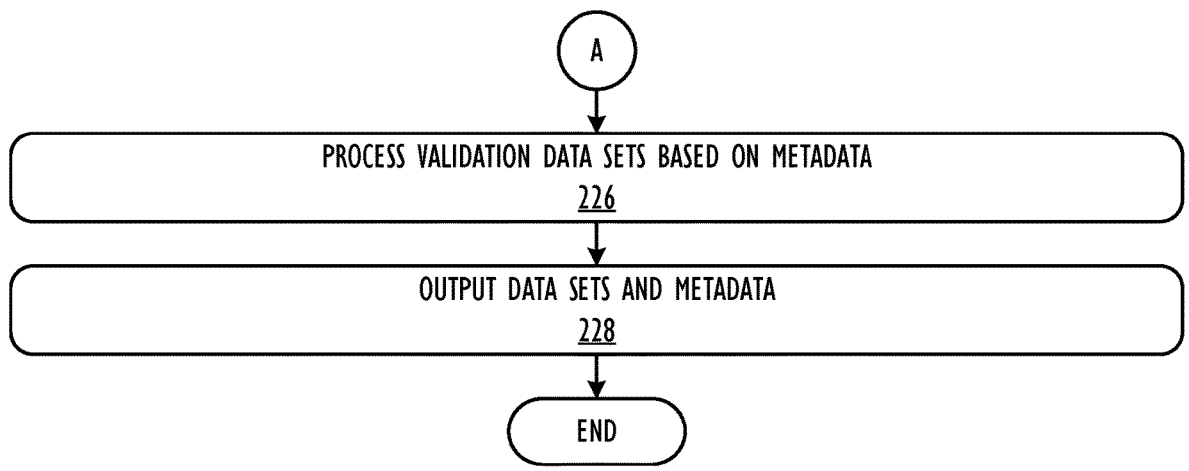

FIG. 2 is a flow diagram for a technique for processing training data 200, in accordance with aspects of the present disclosure. Throughout the technique for processing training data 200 implementation parameters and information about columns, such as which columns are present in which data sets, how columns are associated, how columns are processed, along with steps of processing, derived transformation parameters, and metrics regarding columns, may be stored in a metadata database. The metadata database generally captures information regarding the categories of transformations, actions performed on the data sets, and information about the relationships between source columns and derived columns to help provide consistent processing of later acquired data sets. Examples of potential metadata entries associated with distinct derived columns include a map or other indication as between derived columns and originating source columns, associations between derived columns and transformation functions applied to those derived columns, a root category of transformations applied to a derived column's source column, a last category of transformation applied to a derived column, transformation parameters applied to a derived column which may have been derived from properties of that column's derivation in the training set, and/or a trained model for cases where infill may have been predicted for those columns using ML infill methods. The metadata database may also contain entries to support retrieval of transformation parameters for later processing of additional data. This processing of additional data sets may use column labels of source columns as a key. Examples of potential metadata entries associated with distinct source columns include a root category associated with a source column, which derived columns originated from a source column, and/or a derived column label which, in some instances, may help allow accessing training set derived parameters of transformation functions from the metadata database. The metadata database may also contain transformation parameters, which in certain cases may be applicable to more than one derived column or source column. Examples of potential metadata entries associated with such parameters include any user passed parameters or definitions applied in the initial processing of the training data set, results of a feature importance evaluation, a trained PCA model, if applicable, original source column labels, returned derived column labels, data to support the decoding of predictions from a target ML system trained on the returned sets, software versioning or identification information related to the processing of the training data set or other such information.

At block 202, a tabular training data set is received. This training data set may be passed in, for example, as a file, set of files, references, or another input format. The training data may be organized as a table, with a specific observation of the training data in each row, along with multiple associated feature columns with a single column per feature. For example, the training data may include one or more columns defining aspects of the data set and include cells containing data items. In certain cases, the data sets may include one or more columns designated as labels. These label columns generally identify a specific aspect of the feature the target ML system may be trained on. As an example, for features such as a set of pixel activations from the image of a handwritten character, the label may be the character that the handwritten character is supposed to be recognized as. As another example, for features such as a collection of house properties, the label may be the price of house sale transactions. Thus, the labels define the ground truth associated with the set of features. In certain cases, the label columns may be included as adjoined designated columns to train and/or test data sets. In certain cases where labels may not be available, labels may be automatically designated, for example, via a pattern or based on defined permutations of features. Other columns may be defined, such as an identifier or index column, as well as one or more columns tracking any transformations that may be applied to the feature. In certain cases, certain columns, such as the identifier and/or index columns, may be preserved as unedited, read-only columns in a set which may serve as a store for columns which are to be excluded from transformations, or excluded from deriving infill or feature importance with predictive models.

At block 204, a pre-designated test data set may also be provided. The test data set is typically similar to the training data set but comprises data for use to verify a ML system after the ML system has been trained on the training data set or to generate predictions from a model to be trained on the returned training data. In certain cases, the receiving of the test data set at block 204 may be omitted. At block 206, a feature importance evaluation may be performed for the features and the corresponding labels. In certain cases, the feature importance evaluation may be initiated or omitted based on, for example, an indication from a user. The feature importance evaluation measures impact to ML predictive accuracy associated with the features and may be based on derived properties from source columns, such as transformations between single or multiple column sets. In certain cases, the feature importance evaluation may return a feature importance value associated with each column indicating a predictive significance for the associated column. Feature importance evaluation is discussed below in detail in conjunction with FIG. 3.

At block 208, column labels of the source columns are identified. In certain cases, when columns are provided without labels, block 208 may include the automated assignment of column labels to the columns of the train and/or test data sets. For example, the automated assignment of column labels may be based on the assumption that an order of columns in the training data set, test data set, and/or additional test data set to be processed are consistent. The set of column labels may be stored in the metadata database. If both the training data set and test data set are provided, the data sets may be cross validated to ensure that the training data and test data are consistent. For example, the two data sets may be compared to ensure they have a consistent number of columns, consistent column labels, and/or consistent data set properties. Consistency between the training data and test data with respect to certain columns helps allow the test data set to be evaluated by the trained ML system in a manner consistent with the training data set. In certain cases, block 208 may include the identification or automated assignment of column labels from the columns of the train and/or test data sets. In certain cases, certain columns may be designed for inclusion with a certain data set, without being included in other data sets. For example, certain labels or identifier columns may be included with just the training data set and omitted from the test data set. In certain cases, whether specific columns are included with certain data sets may be user configurable.

At block 210, the data sets are separated into a training data set, potentially, validation data sets, and/or test data sets. Each of the training, validation, and test sets may include consistently partitioned and associated label and ID sets. Label columns may be placed in one or more label sets corresponding to their respective data sets. Any identifier or other read-only columns may be placed in one or more ID sets corresponding to their respective data sets. Where a test data set is included separately from the training data set, the test data set remains the separate test data set, and the validation data set may be defined based on portions of the training data set. In some cases, a validation partition from the training set may be sampled from sequential points, for example from the top or bottom rows of the training set. In some cases, a second validation set may consist of partitioned randomly sampled rows from the first validation set which were partitioned from sequential rows of the training set. In some cases, one or more validation sets may consist of partitioned randomly sampled rows from the training set. In some cases, a ratio of training data to be partitioned for one or more validation sets may be based on user passed parameters. In some cases, the partitioning of a validation data set from the training data set may be omitted.

At block 212, each column of the data sets may be looped though to check to determine if infill is needed for cells of the column. In an alternate configuration, the loop through the columns of block 212 may be parallelized. Data infill generally helps fill holes in a dataset. For example, cells of each column may be checked to verify whether a cell in an existing row is empty or improperly formatted for a root category of data and should be infilled. An indication of whether infill is needed for a cell may be saved, for example, for use in conjunction with an infill process. As an example, a Boolean map of the row/columns may be saved to a metadata database, the Boolean map indicating whether infill is needed. In some cases, preparation of this Boolean map identifying, for example, rows subject to infill for a column may be incorporated as a primitive category entry of transformation in the library of transformation categories per the example of transformation primitives given in Table 1 below such that the collections are returned as columns in the returned training, validation, and/or test sets. In some cases, activation of this Boolean mapping of infill rows as primitive category entries in the transformation trees may be defined based on, for example, user input, such an input argument.

At block 214, a column may be evaluated to determine a root category for the column based on properties of data in the column. For example, data in a first column may be evaluated to determine the two most common variable types of data items in the columns. Based on the determined variable types, potential categories of data transformations and infill technique may be assigned. For example, a column with mostly numerical data types may be a candidate for numerical processing data techniques, where a numerical column with all positive values may be a candidate for a power law transformation. Similarly, a column including categorical information may be a candidate for one hot encoding or ordinal encoding, or a column with mostly date-time data may be a candidate for a time series technique. In certain cases, statistical processing techniques may be determined, for example, based on an evaluation of distribution properties of data in a column. Similarly, techniques for extracting features from string sets may be determined based on properties of the sets. In certain cases, the second most common data type may be included in the basis for determining processing and infill methods when the most common type will be subject to infill.

At block 216, feature engineering transformations based on the identified root category for each column may be applied. Feature engineering generally prepares a data set for use with ML systems by, for example, processing the training data set and/or test data sets into formats that can be readily or more efficiently used by ML systems by shaping or encoding the data sets through one or more data transformations. In certain cases, the feature engineering techniques may be based on the determined root categories from block 214, or may be defined based on, for example, user input, such as a set of input arguments. Multiple transformations may also be applied based on a transformation tree family of primitives. The transformation tree families may be predefined or based on user inputs. These feature engineering transformations may be pulled from a library of feature transformations and may include, for example, one hot encoding, time series segregation by time scale (e.g., by months, days, hours, minutes, or seconds), time series bins segregation (e.g., identification of business hours, weekends, or holidays), z-score normalization, min-max scaling, power law transform such as via box-cox method, bins segregation, or mean absolute deviation scaling, etc. As an example, one hot encoding may spread the categories in a column of the training set to multiple columns and assign a binary value to each cell of the columns. As another example, for numerical data, z-score normalization based on the mean and standard deviation of the train set may be applied. As another example, z-score normalization may be supplemented by adding one or more columns containing binned Boolean identifiers indicating standard deviations of a particular value from a mean value. As another example, min-max scaling may be applied based on the minimum and maximum values of the train set. In certain cases, user provided sets of transformations may also be applied, which may incorporate transformation functions from a built-in library and may also incorporate user defined transformation functions. The feature engineering methods may also incorporate a preliminary infill technique, for example, to facilitate subsequent training of a predictive model for ML infill derivations in block 220. Feature engineering transformations are discussed in more detail below in conjunction with FIG. 4 and FIG. 5. Information indicating the feature engineering techniques applied to the columns and any parameters used to apply those techniques are output as a part of the metadata database. Saving and outputting the metadata database helps allow for consistent processing between multiple datasets across multiple runs and timeframes. For example, an initial training data set and, in some cases, an initial test data set may be processed for initially training a ML system. Once the ML system is trained, additional data may be provided to the ML system to, for example, generate predictions using the ML system. Additional data may be collected after training and this later acquired data may be processed in a manner similar to the initial training data sets to provide a constant and consistently formatted data for the ML system, such as to train a new ML system with consistently formatted data to iterate on the ML system techniques in isolation of random noise effects of data set processing, or to generate predictions from the trained ML system.

At block 218, labels may be processed. Labels associated with the different data sets and separated at block 210 may be processed via feature engineering transformations in a manner similar to that described above for data at block 216 and below with respect to FIG. 3. Labels may also be assigned to various categories based on, for example, whether the label has a single numerical target, a single categorical target, or a multi-column categorical target set. In certain cases, infill may be omitted as to label columns and any rows associated with a blank label may be omitted as well. Metadata associated with the transformation applied to the labels may also be saved and outputted in the metadata database, for example, to support decoding of predictions from a trained ML system.

At block 220, data infilling may be applied, for example, using techniques such as a mean for a numerical set, most common value for a binary set, and Boolean identifiers for categorical data, based on the indication of whether infill in needed for a particular row in columns derived from a source column. In certain cases, the infilling operations of 220 may be omitted, such as when no update is desired from any infill methods that may have been applied in 216 or when the data set does not have any cells that need infill. In certain cases, a user may assign specific infill methods to distinct columns. In certain cases, an automated ML based infill may be applied which attempts to predict infill values based on one or more ML models trained on the rest of the set (i.e., the train set). In addition to filling in the indicted cells, column specific sets of training data, labels, and feature sets for the derivation of the technique used for the infill may be assembled. Where ML based infill is used, the column specific ML models used for the columns may also be outputted as a part of the metadata database. ML based infill is described in more detail below in conjunction with FIG. 6 and FIG. 8. In certain cases, infill may be applied to both, or either the training or test data set. When applied to both data sets, the data infill techniques determined for the training data set may also be applied to the test data set.

Metadata associated with the infill applied to the columns may also be saved and outputted in the metadata database. In an alternate configuration the column evaluation for data infill of block 212 may be performed in conjunction with block 220.

At block 222, dimensionality reduction of the data sets may be performed. The dimensionality reduction may be based on, for example, evaluated feature importance metrics, Principal Component Analysis (PCA), or both. In certain cases, the dimensionality reduction operations may be omitted. In certain cases, a user may elect to reduce the dimensionality of the data sets. In such cases, user provided parameters may be received indicating how column trimming may be performed. For example, a parameter may be provided indicating an n percentage of the total number of columns to retain. In such cases, the column feature importance values associated with each column may be assessed and n percent of the total number of columns retained having the highest feature importance value. As another example, a threshold feature importance metric value may be provided, and in such cases, the feature importance value associated with each column may be compared to the threshold feature importance value to determine whether to keep the respective column. Column removal may also include updating the metadata database for later consistent processing of test data.

Dimensionality reduction may also be applied to either the training data set or both the training and test data sets based on PCA, a type of unsupervised machine learning, based on user provided parameters or default methods. In certain cases, a type of PCA to be applied to the data sets may be user specified. In other cases, a type of PCA to be applied to the data sets, such as for example PCA, Sparse PCA or Kernel PCA, may be based on properties of the training data set. For example, where the data set includes all non-negative numbers, Kernel PCA, Sparse PCA, or PCA may be applied. When the data set includes negative numbers Sparse PCA or PCA may be applied. In certain cases, PCA may automatically be applied to a dataset based on, for example, a ratio of a number of columns to the number of data items. For cases where PCA is applied automatically or based on properties of the training data set, the PCA model is trained based on the training data set and the trained PCA model is used to transform either the training data set or both the training and test data sets to a new, reduced number of columns, which may include a different assigned column label naming convention. In certain cases, the PCA transformation may exclude application to Boolean or ordinal encoded columns, such as may be based on, for example, user passed parameters. In certain cases, the PCA model used on the training data set may be saved to, and outputted with, the metadata database.

At block 224, preparation of the data for oversampling may be applied. In certain cases, the preparation of the data for oversampling may be omitted. Oversampling helps increase a number of rows for labels having a lower frequency in the training data, which may benefit the training operation for a target ML system. In certain cases, oversampling may be based on a collection of sets derived from labels and based on determined label categories, such as a collection of one-hot encoded columns derived from a categorical label set, or a binary encoded column from a binary label set. In certain cases, oversampling may be based on label categories derived from binned groupings of a label set, such as, for example, number of standard deviations from the mean bins or label value powers of 10 bins for a numeric label set. A count for each label class may be collected or, when oversampling based on binned sets such as a number of standard deviations from the mean or bins based on numeric label values powers of 10, a count for each bin may be collected. A multiplier is derived for each label class or bin based on a ratio of a count of the label class or bin with the max count for each label class or bin. For each label class or bin, the corresponding rows of the associated training set, ID set, and labels set may be identified, copied a number of times based on the associated multiplier, and the copied rows attached to the associated training set, ID set, and/or labels set.

At block 226, if any validation data set was partitioned from the training data set in block 210 the partitioned validation data set may be consistently processed based on information in the metadata database. Processing the validation data set may be performed as discussed in detail below in conjunction with FIG. 7. Processing the validation data set may be based on information in the metadata database, rather than in conjunction with the training data set. By processing this validation data separately from the training data, the potential for data leakage between training and validation sets through the derivation of transformation parameters for the transformation functions may be avoided. The validation data set or sets may be used after processing to, for example, tune hyperparameters or for final model validation of a target ML system. In some cases, a validation set for the target ML system may instead be sourced from the processed tabular test data received in block 204. In some cases, the target ML system may not make use of a validation set.

At block 228, the processed data sets and the metadata database are output. A first category of output may include the processed training data set. A second category of output may include a consistently processed validation data set, if selected. In some cases, the processed validation set output may not be returned or may be returned as an empty set. If a test data set was initially received at block 204, a third category of output may include a consistently processed test data. In certain cases, if a test data set was not initially received, then the processed test data set may not be returned or returned as an empty set. In certain cases, the application may output multiple categories of information for each of the returned categories of information for output, such as the processed training set, validation set, and/or test set. One such category of information may include the processed data set, a second such category of information may include the corresponding ID set, and a third such category of information may include the corresponding labels set. In certain cases, the ID sets and/or labels sets may not be returned or returned as an empty set. In certain cases, the rows of the returned sets may be randomly shuffled, and the corresponding labels or ID sets shuffled consistently with the rows of the returned corresponding sets. A fourth category of information may include the returned metadata database for use in subsequently processing additional data. A fifth category of information may include the feature importance results as determined in block 206, if available, and returned as the feature importance evaluation results. The returned, processed, training data set, and zero or more consistently processed validation data sets may then be used to train the target ML system in a manner consistent with the specific ML system. In cases where processed test data sets are provided, the returned consistently processed test data sets may be used, for example, to generate predictions from the target ML system.

Figure 3:
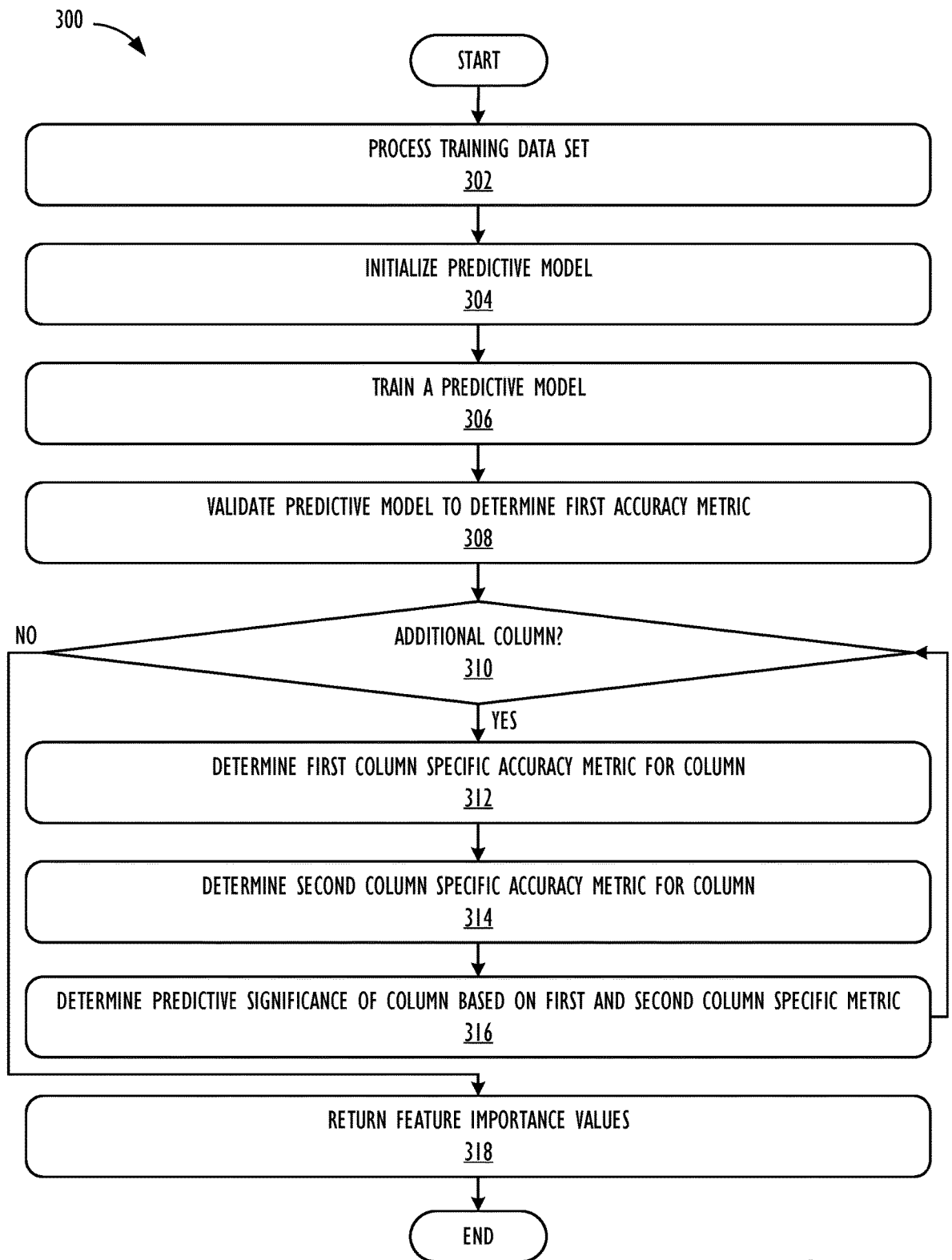
FIG. 3 is a flow diagram for a technique for evaluating feature importance of data, in accordance with aspects of the present disclosure.

FIG. 3 is a flow diagram illustrating a feature importance evaluation 300, in accordance with aspects of the present disclosure. The feature importance evaluation 300 may be performed based on, for example, an indication from a user as discussed in conjunction with block 206 of FIG. 2. The feature importance evaluation 300 may be performed prior to final processing to create sets that are discarded at completion of the feature importance evaluation 300. In certain cases, after feature importance evaluation 300, processed columns may be returned for further operations as discussed in FIG. 2. At block 302, the training data set is processed for preparation of machine learning. For example, the type of data for a particular source column may be analyzed to determine a category of data contained within the column and transformations may be selected based on the determined category. These transformations may be selected from a library of transformations. As a more specific example, the data within a column may be determined to be floating point numerical data and based on this determination, a normalization transformation may be applied, and the normalized data saved into a new derived column associated with the original label. Additional derived columns may be created for additional transformations that may be applied to numerical data. In certain cases, these transformations may be specified by a user, for example, based on one or more transformation families. In certain cases, category specific suffix appendices may be added to the column labels to report the steps of transformation for each of the column labels of the resulting transformed columns. In certain cases, the preparation of data and/or labels at block 302 may be conducted by an implementation of FIG. 2 and/or FIG. 7.

The predictive model may be initialized at block 304. In identifying what type of ML methods are suitable for a category of labels, root category classification designations may be used to identify the type of predictive models for use. For example, the transformation category of the last transformation applied in the derivation of a target column or a target set of columns may be used to identify the type of predictive model. Examples of the types of classifications include numeric sets that will be targets for linear regression predictive algorithms, single column Boolean encoded sets targeted for classification predictive algorithms, or multi-column Boolean encoded sets that targeted for multi-column classification predictive algorithms. Such categorization may also be used to identify how to assemble sets of training data, labels, and features used to generate predictions for the predictive methods. In certain cases, the type of ML architecture initialized model (e.g., support vector machines, random forest regression or classifier, gradient boosting, neural networks, ensembles of architectures, layered ensembles of architectures, etc.) may be populated with one or more hyperparameters, such as may be derived based on properties of the data or by evaluation of experiments on sets of hyperparameter configurations impact towards model accuracy. Certain ML architectures may require different parameter considerations for the type of predictive model. These parameter considerations may be based on user input indicating, for example, specific ML model parameters, or a designated type of ML architecture.

The training data set may then be split into a feature importance training data set, feature importance validation data set, and corresponding labels data sets to train a predictive model at block 306. In certain cases, the performance of the model accuracy of the feature importance training and validation data sets may be algorithmically monitored throughout the training operation to identify an appropriate stopping point for the training operation, for example, to avoid overfitting the model to the training set properties. In certain cases, the feature importance model training 306 may be repeated with multiple configurations of candidate feature engineering transformation sets such as to identify transformation configurations that increase feature importance of columns derived from a source column.

After training, the predictive model may be evaluated as against the feature importance validation data set at block 308 to determine a first accuracy metric. Feature importance metrics may be determined to evaluate impact to predictive accuracy from shuffling one or more target columns in the feature importance validation set to derive a new validation set evaluated against the predictive model. As an example, for a source column, a new feature importance validation data set may be obtained by looking up the derived columns associated with the source column in the column database and randomly shuffling values from the rows of the derived columns into the feature importance validation data set. The predictive model may then be evaluated as against the new feature importance validation data set to obtain a second accuracy metric. For each column at block 310, a source column specific feature importance metric may then be determined at block 312 by subtracting the second accuracy metric from the first accuracy metric. In an alternate configuration, the loop through the columns of block 310 may be parallelized. A derived column specific accuracy metric may be determined at block 314 by looking up the derived columns associated with the source column in the column database and randomly shuffling values in the rows of all but the current derived column into the original feature importance validation set. The predictive model may then be evaluated as against this new feature importance validation set to obtain a third accuracy metric. The derived column specific feature importance metric may then be determined by subtracting the third accuracy metric from the first accuracy metric. Based on column specific feature importance metrics, the predictive significance for a column can be determined at block 316. In this example, larger source column specific feature importance metrics imply a greater relative predictive importance of the source column and smaller derived column specific feature importance metrics imply greater relative predictive importance as between derived columns originating from the same source column. The results from the feature importance evaluation are returned at block 318.

In certain cases, the feature importance evaluation 300 may be performed independent of the preparation of data for machine learning. That is, a user may elect to perform a feature importance evaluation on a data set without transforming the data set, such as that described in the context of FIG. 2. In such cases, the data set may be received from the user, such as that described in conjunction with block 202 of FIG. 2 and passed directly to block 302. The feature importance evaluation proceeds as described above in conjunction with blocks 302-316. At block 318, the feature importance evaluation results are returned to the user, rather than, for example, back to the processing of the training data described in conjunction with FIG. 2. The feature importance evaluation results may be returned to the user, for example, by saving the results into a file or other data object and returning the file or object.

Figure 4:
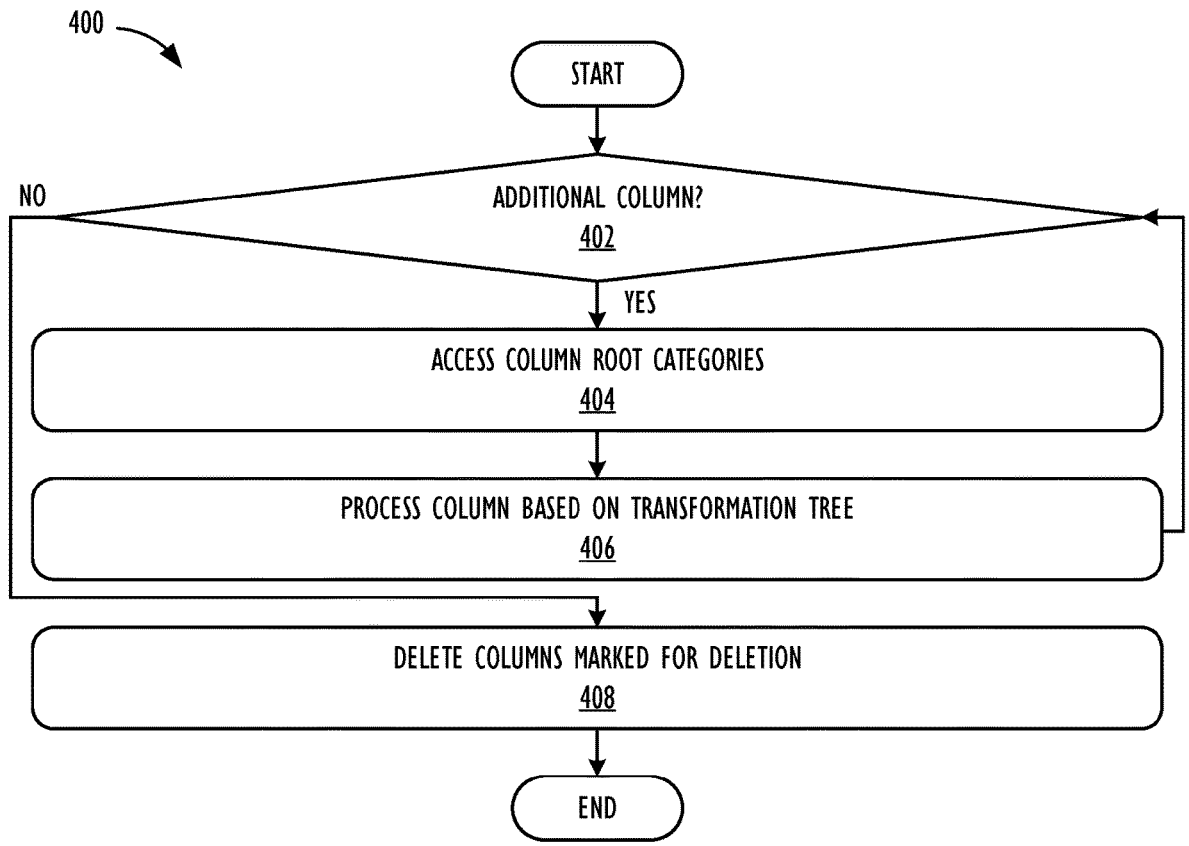
FIG. 4 is a flow diagram illustrating feature engineering transformations, in accordance with aspects of the present disclosure.
Figure 5:
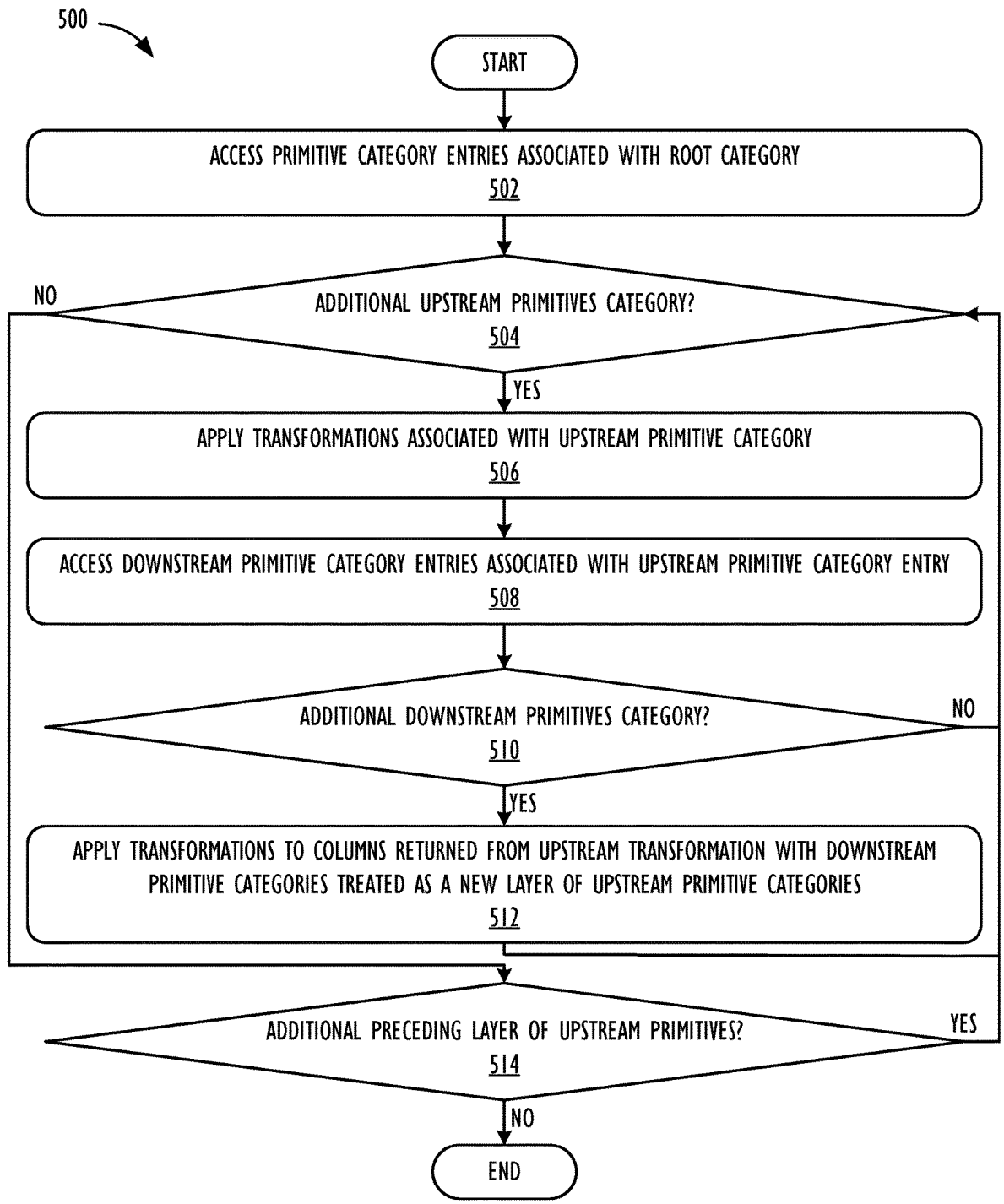
FIG. 5 is a flow diagram illustrating application of transformations based on a transformation tree, in accordance with aspects of the present disclosure.

FIG. 4 is a flow diagram illustrating feature engineering transformations 400, in accordance with aspects of the present disclosure. In certain cases, the feature engineering transformations can be applied to a training data set or both a training data set and test data set. The transformations performed to process a column may include maintaining entries to the metadata database. The feature engineering transformations 400 may also include the application of initial infill methods to missing or improperly formatted cells. Through the application of feature engineering transformations, a column or set of columns, derived from properties of the source column, may be returned. The specific feature engineering transformations applied may be based on one or more transformations defined for a root category associated with a given column. For example, a column may be categorized as having positive numerical values with high skewness distribution properties as described above with respect to block 214. Based on this categorization, for example, a box-cox power law and z-score normalization transformations may be applied in that order. In another configuration, these box-cox power law and z-score normalization transformations may also be supplemented by a set of bins identifying each of the outputted column's cell values number of standard deviations from the mean and/or supplemented by a set of bins identifying the source column's numerical value powers of 10. Such configurations associated with root categories may be based on, for example, user passed parameters.

In accordance with aspects of the present disclosure, one or more transformations and an order in which to apply the transformations may be based on a predefined transformation tree utilizing defined transformation category entries assigned for each root category's transformation primitives. In certain cases, portions of the transformation tree may be defined based on information provided by the user. For example, root category transformation tree primitive entries of transformation categories and/or their associated transformation functions may be defined for incorporation of custom transformations or custom sets of transformations into the platform, for example, by a user. In certain cases, default automated root categories of transformations to be applied based on evaluated data properties of the columns may be user assigned. Table 1 below illustrates an example set of transformation primitives.

TABLE 1

| Primitive | Upstream/ Downstream | Generation applied to | Column Action | Downstream Offspring |
|---|---|---|---|---|
| Parents | Upstream | First | Replace | Yes |
| Siblings | Upstream | First | Supplement | Yes |
| Auntsuncles | Upstream | First | Replace | No |
| Cousins | Upstream | First | Supplement | No |
| Neicesnephews | Downstream Siblings | Offspring | Supplement | Yes |
| Children | Downstream Parents | Offspring | Replace | Yes |
| Coworkers | Downstream Auntsuncles | Offspring | Replace | No |
| Friends | Downstream Cousins | Offspring | Supplement | No |

TABLE 2

| Root Category | | | |
|---|---|---|---|
| Upstream Primitives: | Entries: | Downstream Primitives: | Entries: |
| Parents | Category Entries | Neicesnephews | Category Entries |
| Siblings | Category Entries | Children | Category Entries |
| Auntsuncles | Category Entries | Coworkers | Category Entries |
| Cousins | Category Entries | Friends | Category Entries |

As an example, for a given root category, each primitive may be defined to contain entries of zero or more transformation categories. Table 2 above illustrates an example of how these transformation category entries may be populated in a root category's transformation tree. Each category may have its own defined transformation tree, such that for a given root category, a set of transformations associated with upstream primitives are applied to the column associated with the root category. Where the upstream primitive category entry includes downstream offspring in that category's transformation tree, the downstream offspring categories are identified from the respective transformation tree of the upstream primitive category entry. Additional downstream offspring category entries of the downstream offspring categories may be similarly identified, and transformation functions associated with the one or more levels of downstream offspring are applied to the column returned from preceding upstream primitives with offspring category entry from which the offspring primitive category entries were derived. Where a category of transformation is applied with a Supplement primitive the preceding column upon which the transformation is applied may be left in place unaltered. Where a category of transformation is applied associated with a Replace primitive, the column upon which the transformation is applied may be subject to a deletion operation which may include maintenance of the metadata data for this and associated columns. In this example a root category may be populated as an entry in a primitive of its own transformation tree, for example the transformation function associated with the root category used to access the initial generation of transformation tree for a column may not be applied to the column unless that root category is populated as an entry to one of the primitives of its own transformation tree.

The root category for a given source column of training data and/or test data may be assigned by the user or determined based on an evaluation of data properties such as one performed in block 214 of FIG. 2. As an example, based on the transformation primitives in Table 1, where a first column category is defined as an entry for an offspring primitive of an upstream primitive second column category entry, the transformations which are applied for the first column category may be applied to a column returned from the application of transformations which are applied for the second column category. In certain cases, result values from the transformations may replace current values in the first column category, and in other cases, the result values from these transformations may be appended to the current values in the first column category. In the example based on the transformation primitives in Table 1, results of the transformation are appended as a new column or new set of columns to the data set. In the example based on the transformation primitives in Table 1, categories of transformation that return a multi-column set may only be entries for defined primitives with no downstream offspring. In another configuration, additional primitives may be defined for the purposes of application of transformation functions to multi-column sets in aggregate such as would allow for transformations returning multi-column sets to be assigned as category entries to primitives with downstream offspring. In certain cases, one or more transformations may be defined for specific columns, for example by a user, in a manner similar to that described with respect to the transformation tree for a root category. For example, the user may pass in metadata defining a designated root category for transformations to be applied to specific columns or a user may pass in metadata defining a set of primitive category entries for custom root categories, in each case utilizing the transformation primitives and transformation tree format. Such user passed metadata may comprise a set of transformation categories from categories pre-defined in the library and may also include user-defined categories with user-defined transformation functions that incorporate consistent methods for assembling and returning metadata as the functions in the library. In certain cases, the user may pass parameters to library defined transformation functions to specify variations on the library defined transformation functions. In certain cases, the user provided metadata may be saved into and output with the metadata.

In addition to the transformation primitives, each library defined category or user defined category may also be categorized based on a set of properties such as an identification of an associated transformation function, the categorization of types of data considered as suitable for infill, the categorization of types of ML methods suitable for targeting columns for this category, and the identification of a column or set of columns returned from the application of the category transformation tree suitable to serve as a target column or target set of columns for ML methods such as ML infill or feature importance.

With respect to identifying transformation functions, a category may make use of different types of transformation functions depending on which data sets are to be targeted. For example, transformation functions may derive properties from a training set column for processing that column, transformation functions may use properties derived from a previously processed, corresponding training set column to subsequently process a test set column, transformation functions may process both a corresponding training and test set column based on properties derived from the training set column in application, or transformation functions may independently process either a train set column or test set column without the use of properties derived from a train set column. The training set properties for consistent processing between training and test sets with these transformation functions may be accessed from the metadata database or alternatively derived from the training set during application of a transformation function. Transformation functions may return a single column or a set of columns. A user may also define and pass custom transformation functions making use of consistent metadata assembly methods.

In identifying what kind of data might be suitable for infill for a defined category, a category may be distinguished, for example, based on when data is expected as numeric floats, data is expected as numeric within a given range, data expected as integers, data where non-numeric values are allowed, data expected as a fixed range of categoric values, data that is expected to be already Boolean encoded, data that is expected to be in time series form, or data expected as strings with some kind of consistent formatting such as consistent prefixes or suffixes.

In identifying what type of ML methods are suitable for targeting columns with this category, designations may identify the type of predictive models for use with the feature importance evaluation or the ML infill. Examples of the types of classifications include numeric sets that will be targets for linear regression predictive algorithms, single column Boolean encoded sets targeted for classification predictive algorithms, or multi-column Boolean encoded sets targeted for multi-column classification predictive algorithms. Such categorization may also be used to identify how to assemble sets of training data, labels, and features used to generate predictions for the predictive methods.

If there are any additional columns at block 402, at block 404, the columns are checked to see if specific root categories have been assigned by the user to the columns. If specific root categories have not been assigned to certain columns, then categories based on an evaluation, such as those derived in block 214, may be assigned to those specific columns as root categories. In an alternate configuration, the loop through the source columns of block 402 may be parallelized. At block 406, columns are processed based on the transformation tree associated with the root categories of the columns. For example, for a root category of a column, the transformation tree associated with the root category may be accessed and a first upstream primitive category entry associated with the root category determined. Transformations associated with downstream primitive category entries associated with the transformation tree of the upstream primitive category entry, which apply to offspring generations, may be applied after transformations associated with the preceding upstream primitive category entry, either recursively cycling up and down branches through the generation layers of the transformation tree such as in FIG. 5 or sequentially through each layer of offspring. Columns which are identified for replacement based on their associated primitive, such as for the application of a Replacement primitive category entry, are marked for deletion and deleted at block 408. Such deletion operation may include the maintenance of the metadata used to support infill or used for subsequent consistent processing of test data as discussed in conjunction with FIG. 7.

As discussed above in conjunction with block 406, columns may be processed based on the transformation tree associated with the root category of a given column. FIG. is a flow diagram illustrating application of transformations based on a transformation tree 500, in accordance with aspects of the present disclosure. In certain cases, the application of transformations can be applied to a training data set or both a training set and test data set. At block 502, a transformation tree of primitives and their associated category entries may be accessed based on the root category associated with the column. Table 1 above illustrates an example set of transformation primitives and Table 2 illustrates an example of primitive category entries corresponding to this example. At block 504, if the transformation primitive has upstream primitive category entries, transformations associated with those upstream primitive category entries may be accessed and applied to the column at block 506. In this example the transformations applied to the data points are returned as an additional column or set of columns appended to the data set. If the upstream primitive was a Replacement primitive the column or set of columns from which it was derived is marked for deletion, for example in block 408. The application of the categories of transformations also include the development and maintenance of associated metadata. The upstream primitive category entry whose transformation was applied in block 506 is then used as a key to access the downstream primitive category entries from that category's transformation tree. At block 510, if the entries in block 508 find downstream primitive category entries, those categories are treated as a new layer of upstream primitives per the example in Table 1 and applied as a new layer to the methods starting in block 504. If no downstream primitive category entries are identified in block 510, the iteration reverts to the preceding application of the block 504 loop for the upstream primitive category entries. Once the loop of block 504 has cycled through all of the upstream primitive category entries of the current layer it reverts to the preceding layer of upstream primitive category entries per block 514. Once the loop of block 504 has cycled through all of the upstream primitive category entries of the topmost layer of the original column root category transformation tree, the cycle is exited from block 514 and the process returns. In certain cases, category specific suffix appendices may be added to the column labels to report the steps of transformation for each of the column labels of the resulting transformed columns.

Figure 6:
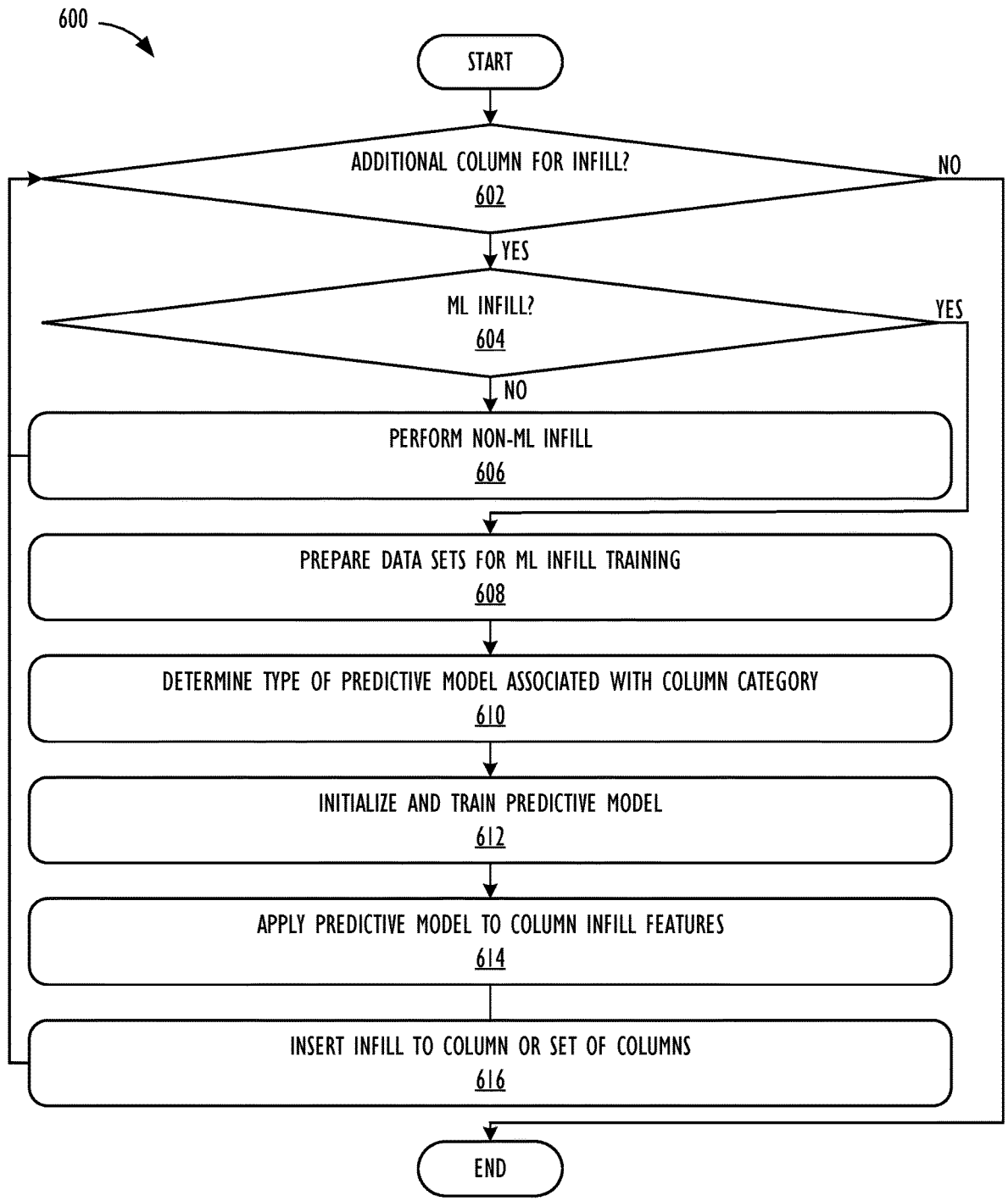
FIG. 6 is a flow diagram illustrating infilling, in accordance with aspects of the present disclosure.

FIG. 6 is a flow diagram illustrating infilling 600, in accordance with aspects of the present disclosure. The infilling 600 may be performed for a target training data set, a target test data set, or both in parallel. The identification of rows needing infill may be based, for example, on the results of block 212, or in an alternate configuration based on an evaluation comparable to block 212 performed preceding infilling 600. At block 602, derived columns of a data set, such as those discussed in conjunction with FIG. 4, are looped through. As part of block 602 the columns may be checked against a metadata database to determine if infill has previously been performed in conjunction with another column from the same multi-column set, such as if a column was derived as part of a multi-column output transformation function. In certain cases, a user may designate infill techniques to be applied to the data sets. For example, a user may designate a particular infill technique, such as, for example, ML infill, one infill (infill with "1"), adjacent cell infill, median value infill, etc., on either all or specific columns. In other cases, the user may designate that infill should occur without specifying an infill technique and default infill techniques may be applied based on defaults for the column category, such as Boolean identifiers for categorical columns. In certain cases, the infill derivation and application may be performed in conjunction with feature engineering transformations. In certain cases, the infill application may be omitted. The type of infill technique to be applied is determined at block 604. Where a non-ML infill technique is to be applied, the infill technique is applied at block 606, and derivation of infill or insertion may be based on rows identified as needing infill. At block 606, if the infill was inserted for a multi-column set, the columns of the multi-column set may be recorded in a metadata database as having received infill.

If a ML infill technique is designated, at block 608, the data sets for ML infill training may be prepared. As an example of preparing the infill training data set, the rows from the training data set corresponding to cells identified as needing infill may be partitioned from the training data set so as to serve as features for predicting infill once a ML model is trained, with columns from the training data set derived from the same source column currently subject to infilling removed. Removing these columns helps avoid data leakage. The rows from the training data set corresponding to cells identified as not needing infill may be partitioned from the training data set so as to serve as data for training a ML model, with columns from the training data set derived from the same source column currently subject to infilling removed. The column for which infill is to be predicted with cells not needing infill may be used as labels for the ML infill model training, with other columns from the training data set derived from the same source column as the column currently subject to infilling removed. In certain cases, such as when the target column was derived from a transformation function returning a multi-column set, the labels for the ML infill model training may be derived from a multi-column set for rows with cells not needing infill, with other columns from the training data set derived from the same source column as the column set currently subject to infilling removed. In certain cases, the set intended as the training set for the ML infill model and corresponding target labels sets may be split into subsets for training data set and validation data set to support hyperparameter tuning and final model validation. In certain cases, data from a test data set may be similarly processed, which may include the identification of rows of a source column needing infill and the assembling of partitioned feature sets for rows needing infill to generate infill predictions from the ML infill model trained on a corresponding training data set for insertion to the target column or set of columns of the test data set.

At block 610, the label column category is used to determine a type of predictive model associated with the category. For example, the transformation category of the last transformation applied in the derivation of a target column or a target set of columns may be used to identify the type of predictive model. For example, for numerical data, a regression model may be applied. As another example, for single column or multi column categorically encoded data, a classifier model may be applied. In certain cases, the type of ML architecture initialized model (e.g., support vector machines, random forest regression or classifier, gradient boosting, neural networks, ensembles of architectures, layered ensembles of architectures, etc.) may be populated with one or more hyperparameters, such as may be derived based on properties of the data or by evaluation of experiments on sets of hyperparameter configurations impact towards model accuracy. Certain ML architectures may require different parameter considerations for the type of predictive model. These parameter considerations may be based on user input indicating, for example, specific ML model parameters, and/or a designated type of ML architecture. At block 612, the determined type of predictive model is initialized and trained on the infill training data set. In certain cases, the performance of the model accuracy of the ML infill column specific training and validation data sets may be algorithmically monitored throughout the training operation to identify an appropriate stopping point for the training operation such as to avoid overfitting the model to the training set properties. The predictive model may also be initialized based on the one or more determined parameters for the predictive model. At block 614, the predictive model is applied to the set of features derived from rows of the training data set and/or test data set for which the target column or set of target columns were identified as subject to infill to obtain a set of infill value predictions corresponding to rows in the training data set and/or test data set with missing or improperly formatted items. At block 616, this set of infill values may be inserted into the rows of the training data set and/or test data set. This insertion may be based on rows identified as needing infill. At block 616, the predictive model is also saved as a part of the metadata database. At block 616, if the infill was inserted for a multi-column set, the columns of the multi-column set may be recorded in a metadata database as having received infill.

Additional consistent processing of training or test data for a ML system may be desired after the initial preparation of data for the ML system is performed. For example, additional training data may be obtained. There may be a desire to consistently process this additional data in order to maintain consistency and training efficacy with the initial training data. There may be a desire to consistently process data such as to experiment with architecture or parameters of the target ML system in isolation of any stochastic noise from the data preparation process. There may be a desire to consistently process subsequently available data to generate predictions from a model trained with the initially processed data. There may be a desire to consistently process data that was split from the training data so as to serve as validation sets for tuning machine learning hyperparameters or for final validation of a machine learning model, as any inclusion of validation data in the training sets used to derive column specific parameters for transformation functions may lead to data leakage between training and validation sets. As an example, a metadata database may be provided that includes records of the transformations and parameters used to prepare the initial training data. These records may include both user provided information as well as information that was determined as a part of processing the initial training data, such as the column types or the predictive model used for ML infill. In certain cases, processing additional training data may be based on information in the metadata database, thus reducing an amount of user provided information needed to prepare the additional training data.

Figure 7A:
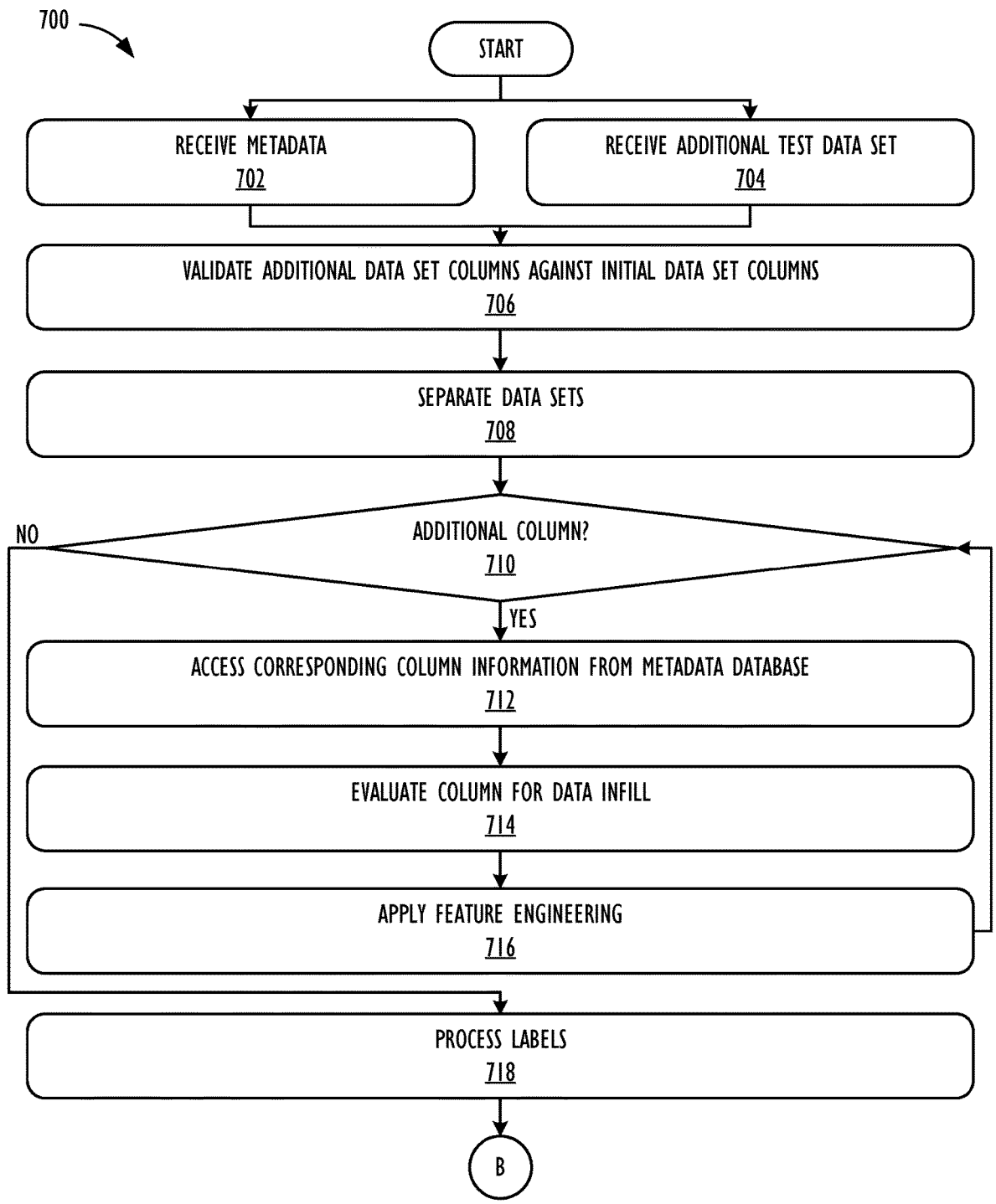
FIG. 7 is a flow diagram illustrating a technique for consistently processing additional data, in accordance with aspects of the present disclosure.
Figure 7B:
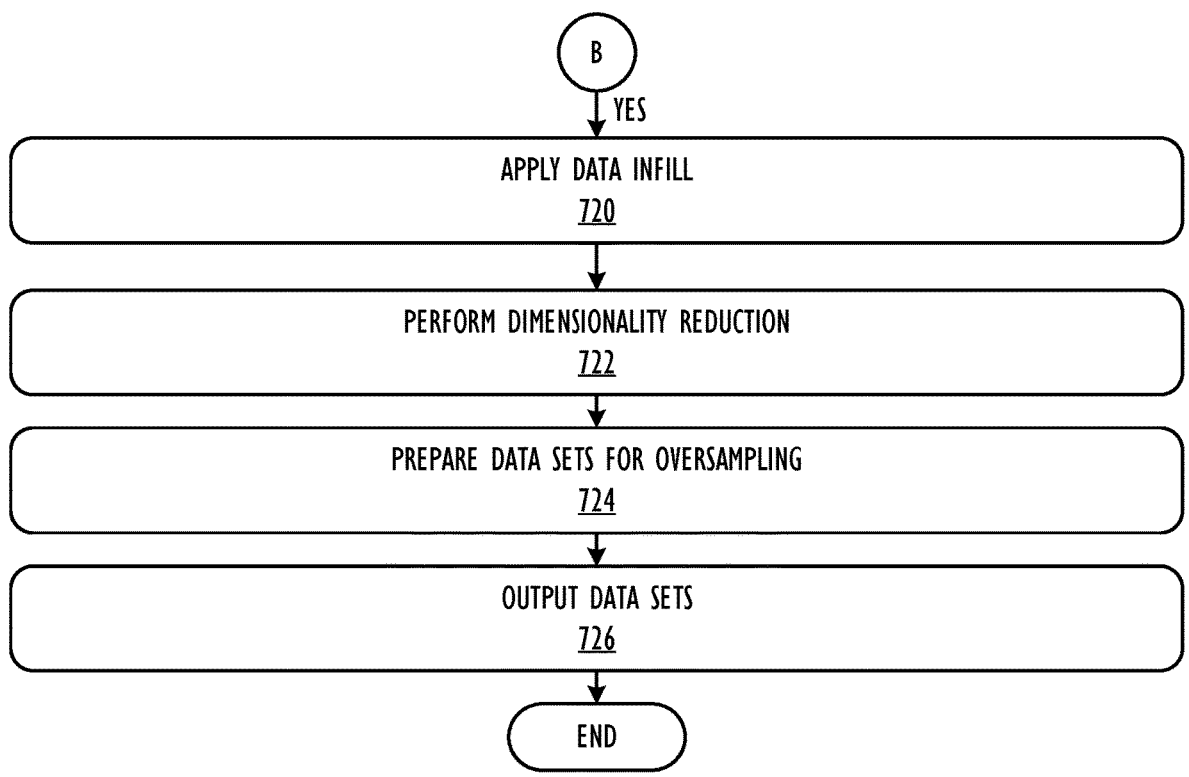

FIG. 7 is a flow diagram illustrating a technique for consistently processing additional test or training data 700, in accordance with aspects of the present disclosure. As discussed in detail above in conjunction with block 228, after preparing the initial training data set, the metadata database is output along with the processed initial training data set. At block 702, the metadata database output from the processing of the initial training data set, such as from block 114 of FIG. 1, is received. At block 704, a tabular additional test data set is received. In certain cases, an additional training data set may instead be received at block 704. At block 706, column labels of the additional test data set are identified. In certain cases, when columns are provided without labels, block 706 may include the automated assignment of column labels to the columns of the additional test data sets based on a list of column labels stored in the metadata database. For example, the automated assignment of column labels may be based on an assumption that order of columns in the train data set used to populate the metadata database and additional test data set are consistent. In certain cases, the additional test data set or additional training data set may be validated as against the initial training data for consistency. For example, the columns present in the additional test data set may be compared to the columns of the initial training data set for consistency in column identifiers or data set properties. At block 708, ID and/or label columns may be placed into separate label sets and/or ID sets for the additional test data set in a way similar to block 210 of FIG. 2. In certain cases, this placement into separate sets may be omitted. At block 710, the columns of the additional test data set are looped through. In an alternate configuration, the loop through the source columns of block 710 may be parallelized. At block 712, information corresponding with the present column in the metadata database may be identified and accessed. At block 714 the column of the additional test data set is checked to determine if infill is needed for cells of the column in a manner similar to block 212 of FIG. 2. At block 716, feature engineering transformations may be applied to the column of the additional test data set, based on information retrieved from the metadata database, in a manner similar to block 216 of FIG. 2 and similar to the processes described in FIG. 4 and FIG. 5. For the transformation functions associated with transformation tree primitive category entries applied as part of block 716, parameters of transformation may be retrieved from the metadata database, wherein retrieved parameters were derived from the corresponding columns of the training dataset used to populate the metadata database. In certain cases, a preliminary infill may be applied as part of the feature engineering transformations of block 716 such as to prepare data for the subsequent predictive algorithms of ML infill in block 720. At block 718, if a labels column is designated for the additional test data set, labels may be processed in a manner similar to block 218 of FIG. 2 and similar to the processes described in FIG. 4 and FIG. 5. For the transformation functions associated with transformation tree primitive category entries applied as part of block 718, parameters of transformation may be retrieved from the metadata database, wherein retrieved parameters were derived from the corresponding columns of the training dataset labels used to populate the metadata database. At block 720, infill may be applied to the derived columns of the additional test data set based on information provided by the metadata databased in a manner described in more detail below in conjunction with FIG. 8. In certain cases, this infill insertion may be omitted. At block 722, dimension reduction may be performed to the additional test data set in a manner similar to block 222 of FIG. 2. If feature importance dimension reduction was performed in block 222, the feature importance results derived from the initial training set in conjunction with block 222 may be accessed from the metadata database and used as a basis of the dimension reduction to the additional test data set. If PCA dimensionality reduction was performed in block 222, the PCA model trained on the training set may be accessed from the metadata database for application to transform corresponding columns of the additional test data set. In certain cases, dimension reduction may be omitted. At block 724, preparation of the additional test data set for oversampling may be applied in a manner similar to block 224 of FIG. 2, based on label sets processed in block 718. In certain cases, preparation of data for oversampling may be omitted. At block 726, the processed additional test data set may be returned for output. The outputted additional test data set may include corresponding sets of ID and/or label sets based on what may have been partitioned in block 708. In certain cases, the metadata database may not be output as a part of outputting the processed additional training data. In certain cases, a feature importance evaluation may be incorporated into the technique 700 based on an implementation of FIG. 3 such as may evaluate an additional test data set and/or an additional training data set.

Figure 8:
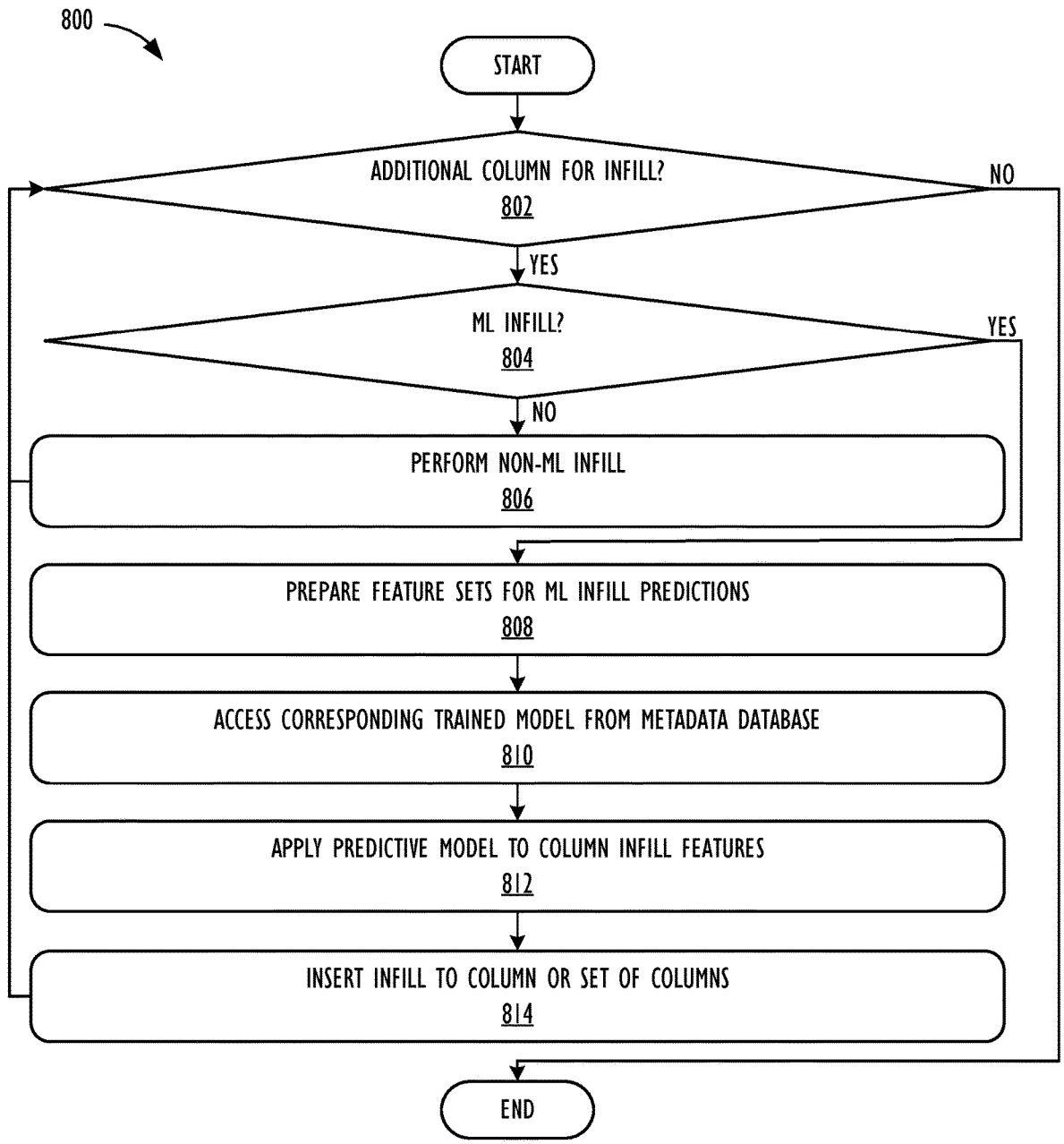
FIG. 8 is a flow diagram illustrating consistent infilling, in accordance with aspects of the present disclosure.

FIG. 8 is a flow diagram illustrating a technique for consistent infilling 800, in accordance with aspects of the present disclosure. As discussed above in conjunction with block 720 of FIG. 7, infilling may be applied based the technique for consistent infilling 800. The identification of rows needing infill may be based, for example, on the results of block 714, or in an alternate configuration based on an evaluation comparable to block 714 performed preceding consistent infilling 800. At block 802, the derived columns of a data set are looped through. In an alternate configuration, the loop through the columns of block 802 may be parallelized. As part of block 802 the columns may be checked against a metadata database to determine if infill was previously performed in conjunction with another column, for example, as a part of a multi-column output transformation function. At block 804, a type of infill to be performed may be determined. In certain cases, a user may designate infill techniques to be applied to the data sets. The type of infill technique to be applied may be determined based on information stored in the metadata database for the corresponding column or the set of columns from the training set used to populate the metadata database. In certain cases, the infill derivation and application may be instead performed in conjunction with the feature engineering transformations, such as those discussed above in conjunction with block 714. Where a non-ML infill technique is to be applied, the infill technique may be applied at block 806. This infilling may be based on rows identified as needing infill. At block 806, if the infill was inserted for a multi-column set, the columns of the multi-column set may be recorded in a metadata database as having received infill.

If a ML infill technique is designated, at block 808, feature sets for ML infill predictions may be prepared from partitions of the data set. As an example of preparing the infill predictions feature sets, rows corresponding to cells identified as needing infill may be partitioned from the data set so as to serve as features for predicting infill, with columns from the data set derived from the same source column currently subject to infilling removed in a way similar to that discussed in conjunction with block 608. At block 810, the ML infill model trained from the corresponding column or set of columns from the training data set used to populate the metadata database is accessed from the metadata database. At block 812, the predictive model is applied to the set of features derived from rows for which target column or set of target columns that were infilled to obtain a set of infill value predictions corresponding to rows in the training data set or test data set with missing or improperly formatted items. At block 814, this set of infill values are inserted into the corresponding rows of the data set based on rows identified as needing infill. At block 814, if the infill was inserted for a multi-column set, the columns of the multi-column set may be recorded in a metadata database as having received infill.

Figure 9:
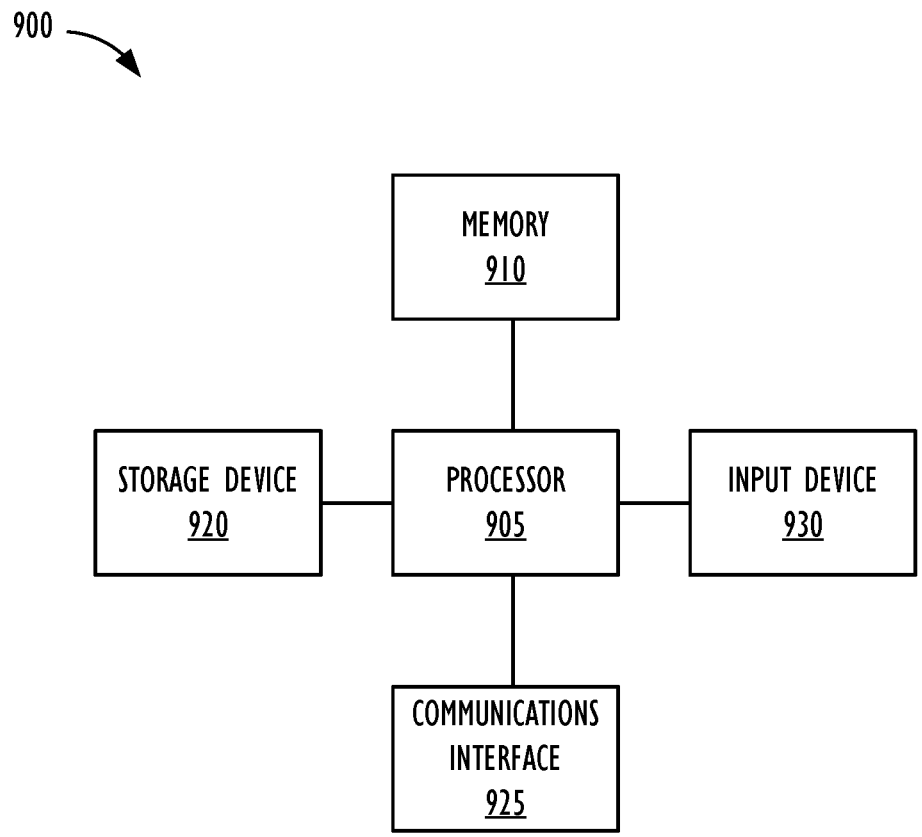
FIG. 9 is a block diagram of an embodiment of a computing device, in accordance with aspects of the present disclosure.

FIG. 9 is a block diagram of an embodiment of a computing device 900, in accordance with aspects of the present disclosure. As illustrated in FIG. 9, device 900 includes a processing element such as processor 905 that contains one or more hardware processors, where each hardware processor may have a single processor core or multiple processor cores. Examples of processors include, but are not limited to, a central processing unit (CPU) or a microprocessor. Although not illustrated in FIG. 9, the processing elements that make up processor 905 may also include one or more other types of hardware processing components, such as graphics processing units (GPUs), tensor processing units (TPUs), application specific integrated circuits (ASICs), field-programmable gate arrays (FPGAs), digital signal processors (DSPs), and/or quantum computing processors such as quantum annealing devices, noisy intermediate-scale quantum (NISQ) devices, or universal quantum computing devices. Generally, device 900 may perform any of the functionality described above (e.g., in conjunction with FIGS. 1-8).

FIG. 9 illustrates that memory 910 may be operatively and communicatively coupled to processor 905. Memory 910 may be a non-transitory computer readable storage medium configured to store various types of data. For example, memory 910 may include one or more volatile devices such as random access memory (RAM). Non-volatile storage devices 920 can include one or more disk drives, optical drives, solid-state drives (SSDs), tap drives, flash memory, electrically programmable read only memory (EEPROM), and/or any other type memory designed to maintain data for a duration time after a power loss or shut down operation. The non-volatile storage devices 920 may also be used to store programs that are loaded into the RAM when such programs executed.

Software programs may be developed, encoded, and compiled in a variety of computing languages for a variety of software platforms and/or operating systems and subsequently loaded and executed by processor 905. In one embodiment, the compiling process of the software program may transform program code written in a programming language to another computer language such that the processor 905 is able to execute the programming code. For example, the compiling process of the software program may generate an executable program that provides encoded instructions (e.g., machine code instructions) for processor 905 to accomplish specific, non-generic, particular computing functions. In certain cases, the software program may be configured for parallelized operations, for example on a GPU, co-processor, ML processor, quantum computing processor, or other processor provided in addition to processor 905.

After the compiling process, the encoded instructions may then be loaded as computer executable instructions or process steps to processor 905 from storage 920, from memory 910, and/or embedded within processor 905 (e.g., via a cache or on-board ROM). Processor 905 may be configured to execute the stored instructions or process steps in order to perform instructions or process steps to transform the computing device into a non-generic, particular, specially programmed machine or apparatus. Stored data, e.g., data stored by a storage device 920, may be accessed by processor 905 during the execution of computer executable instructions or process steps to instruct one or more components within the computing device 900. Storage 920 may be partitioned or split into multiple sections that may be accessed by different software programs. For example, storage 920 may include a section designated for specific purposes, such as storing program instructions or data for updating software of the computing device 900. In one embodiment, the software to be updated includes the ROM, or firmware, of the computing device. In certain cases, the computing device 900 may include multiple operating systems. For example, the computing device 900 may include a general-purpose operating system which is utilized for normal operations.

In certain cases, elements coupled to the processor may be included on hardware shared with the processor. For example, the communications interfaces 925, storage 920, and memory 910 may be included, along with other elements such as the digital radio, in a single chip or package, such as in a system on a chip (SOC). Computing device may also include input and/or output devices, not shown, examples of which include sensors, cameras, human input devices, such as mouse, keyboard, touchscreen, monitors, display screen, tactile or motion generators, speakers, lights, etc. Processed input, for example from a camera device 930, may be output from the computing device 900 via the communications interfaces 925 to one or more other devices.

What is claimed is:

1. A method for consistently preparing data for a machine learning (ML) system, comprising:
   receiving a tabular training data set, the training data set including a set of one or more source columns;
   identifying column labels from the training data set, the column labels associated with a source column of data points;
   determining, for each identified column label, a root category based on at least one of a user specification, data types, or distribution properties associated with the data points in each column of the set of source columns;
   performing one or more data transformations for data points in a source column in an order based on defined primitives of a transformation tree to obtain a transformed data set, the transformation tree including defined primitive category entries associated with each root category, wherein the defined primitives associated with the source column are based on a root category associated with the source column, wherein the defined primitive category entries for the root category are associated with a defined transformation function set, wherein the transformation function set includes transformation functions for training data sets and test data sets, wherein the primitives are used to specify the type, order, and retention of univariate transformations performed on a training data basis in a hierarchy associated with a root category applied to the source column to return zero, one, or more columns derived from a source column, wherein the set of primitives include upstream and downstream primitives, wherein the set of primitives include primitives that may supplement or replace the input data representation, wherein the set of upstream primitives include primitives with or without offspring, wherein a category entry to an upstream primitive with offspring is used to access a separate transformation tree to access a set of corresponding downstream primitive category entries, wherein this set of downstream primitives is treated as a set of upstream primitives for their state of received data representation;

recording the column categories determined for each identified column label and properties of the data transformations performed for each source column in a metadata database;

outputting the metadata database and transformed training data set, wherein the transformed training data set is for training a ML system, and wherein the metadata database is output for use by a user for additional data sets;

receiving a tabular additional data set and the metadata database;

performing the one or more data transformations for data points in corresponding additional columns of the tabular additional data set using the recorded column categories and properties of the data transformations from the metadata database to obtain a transformed additional data set on a basis derived from a corresponding training data set; and outputting the transformed additional data set for use with the ML system.

2. The method of claim 1, further comprising:
generating a derived data set based on one of the training data set or additional data set, the derived data set including one or more derived columns;
partitioning the derived data set into a feature importance training data set, feature importance validation data set, and corresponding labels data set;
training a predictive model based on the feature importance training data set and the corresponding labels data set;
evaluating the trained predictive model on the feature importance validation data set to generate a first accuracy score;
shuffling rows of one or more columns in the feature importance validation data to generate a manipulated feature importance validation set;
evaluating the trained predictive model on manipulated feature importance validation set to generate a second accuracy score;
generating a feature importance evaluation score is based on a difference between the first accuracy score and the second accuracy score; and
outputting the feature importance evaluation score.

3. The method of claim 2, further comprising:
shuffling rows of the derived columns sharing the same source column in the feature importance validation data to generate a source column feature importance validation set; and
determining a source column feature importance metric based on a difference between the first accuracy score and the second accuracy score.

4. The method of claim 2, further comprising:
shuffling rows of columns of the derived columns not corresponding to the target derived column in the feature importance validation data to generate a derived column feature importance validation set;
evaluating the trained predictive model accuracy on the derived column feature importance validation set to determine a third accuracy score; and
generating a derived column feature importance metric based on a difference between the first accuracy score and the third accuracy score.

5. The method of claim 1, further comprising:
performing a principle component analysis (PCA) on the transformed training data set by:
determining a type of PCA to be performed and associated PCA parameters based on at least one of user passed parameters or by evaluating properties of the training data set;
training a PCA model based on the transformed training data set; and
applying the trained PCA model to transform a set of two or more columns of the training data set into a reduced number of columns.

6. The method of claim 5, further comprising:
saving the trained PCA model in the metadata database and applying the trained PCA model in the metadata database to transform a set of two or more columns of the additional data set into a reduced number of columns.

7. The method of claim 1, further comprising preparing one of the transformed training data or transformed additional data set for oversampling by:
identifying one or more rows of the transformed data set corresponding to each of a set of labels;
identifying a ratio of a number of each labeled row to a maximum number of labeled rows;
determining from the ratio a multiplier associated with each label; and
appending one or more copies of the one or more rows for each label based on the multiplier.

8. The method of claim 7, wherein the set of labels are derived for a numerical label set based on binned aggregations of the data.

* * * * *